(12) United States Patent
Tani

(10) Patent No.: US 9,223,350 B2
(45) Date of Patent: Dec. 29, 2015

(54) SLIDABLE DISPLAY PORTABLE MOBILE DEVICE

(75) Inventor: Minako Tani, Daito (JP)

(73) Assignee: KYOCERA Corporation, Kyoto (JP)

( * ) Notice: Subject to any disclaimer, the term of this patent is extended or adjusted under 35 U.S.C. 154(b) by 552 days.

(21) Appl. No.: 13/578,594

(22) PCT Filed: Feb. 9, 2011

(86) PCT No.: PCT/JP2011/052780
§ 371 (c)(1),
(2), (4) Date: Aug. 10, 2012

(87) PCT Pub. No.: WO2011/099535
PCT Pub. Date: Aug. 18, 2011

(65) Prior Publication Data
US 2012/0309465 A1     Dec. 6, 2012

(30) Foreign Application Priority Data

Feb. 12, 2010  (JP) .................................. 2010-028545
Feb. 12, 2010  (JP) .................................. 2010-028546
Feb. 12, 2010  (JP) .................................. 2010-028547
Feb. 12, 2010  (JP) .................................. 2010-028548

(51) Int. Cl.
*H04M 1/00*     (2006.01)
*G06F 1/16*     (2006.01)
*H04M 1/02*     (2006.01)

(52) U.S. Cl.
CPC .............. *G06F 1/1647* (2013.01); *G06F 1/165* (2013.01); *G06F 1/1624* (2013.01);
(Continued)

(58) Field of Classification Search
CPC ............ H04M 1/0237; H04M 1/0235; H04M 1/0239; H04M 1/0266

USPC .......... 455/566, 575.4, 550.1; 345/1.1, 9, 31, 345/108; 361/679.04; 379/433.12
See application file for complete search history.

(56) References Cited

U.S. PATENT DOCUMENTS 7,622,685 B2   11/2009  Miyaoka
2007/0164923 A1   7/2007  Kanai et al.
(Continued)

FOREIGN PATENT DOCUMENTS

JP    H05-061567 A    3/1993
JP    2008-271062 A    11/2008
(Continued)

OTHER PUBLICATIONS

International Search Report dated May 17, 2011, issued in International Application No. PCT/JP2011/052780.

*Primary Examiner* — Nay A Maung
*Assistant Examiner* — Angelica M Perez
(74) *Attorney, Agent, or Firm* — Procopio, Cory, Hargreaves & Savitch LLP

(57) ABSTRACT

A portable electronic device includes a device body, a first image display panel on a front surface of the device body, a second image display panel, and a coupling portion. The second image display panel has a structure in which light incident from a back surface side of the second image display panel is transmitted toward a side of an image display surface of the second image display panel, and overlaps with an image display surface of the first image display panel. The coupling portion slidably couples the second image display panel to the device body to reciprocate the same along a predetermined path over the image display surface of the first image display panel. The image display surface of at least one of the first image display panel and the second image display panel is provided with an inputting touch panel having a light transmittance.

17 Claims, 21 Drawing Sheets

(52) U.S. Cl.
CPC .......... *G06F 1/1643* (2013.01); *H04M 1/0247* (2013.01); *H04M 1/0216* (2013.01); *H04M 1/0237* (2013.01); *H04M 2250/16* (2013.01); *H04M 2250/22* (2013.01)

(56) References Cited

U.S. PATENT DOCUMENTS

| | | |
|---|---|---|
| 2009/0061963 A1 | 3/2009 | Miyaoka |
| 2009/0179874 A1 | 7/2009 | Watanabe |
| 2010/0007576 A1* | 1/2010 | Demuynck et al. ............ 345/1.3 |
| 2010/0056222 A1* | 3/2010 | Choi et al. ................... 455/566 |
| 2010/0240426 A1 | 9/2010 | Tanaka et al. |
| 2010/0255862 A1 | 10/2010 | Mitsunaga et al. |
| 2010/0331063 A1* | 12/2010 | Grant et al. ................ 455/575.4 |
| 2011/0007009 A1 | 1/2011 | Ishihara et al. |

FOREIGN PATENT DOCUMENTS

| | | |
|---|---|---|
| JP | 2009-027321 A | 2/2009 |
| JP | 2009-059102 A | 3/2009 |
| JP | 2009-060292 A | 3/2009 |
| JP | 2009-071364 A | 4/2009 |
| JP | 2009-111798 A | 5/2009 |
| JP | 2009-163356 A | 7/2009 |
| JP | 2009-171085 A | 7/2009 |
| WO | 2005/020046 A1 | 3/2005 |
| WO | 2009/028585 A1 | 3/2009 |

* cited by examiner (a)    (b)

(a)   (b)

(a)                           (b)

(a)

(b)

F I G. 5 0
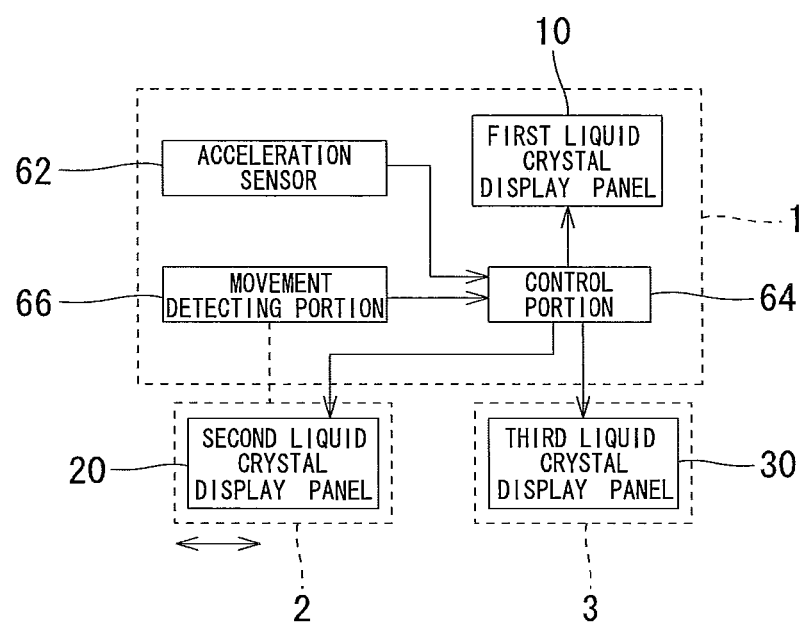

SLIDABLE DISPLAY PORTABLE MOBILE DEVICE

TECHNICAL FIELD

The present invention relates to various portable electronic devices having an image display panel such as a portable telephone.

BACKGROUND ART

Conventionally, there has been widely used a portable telephone of a straight type, a sliding type or a folding type.

Moreover, there is conventionally supposed a structure of the portable telephone of a sliding type in which a second liquid crystal display panel is provided on a front surface of a casing in a lower stage, and an image display surface of the liquid crystal display panel is provided with an inputting touch panel having a light transmittance while covering the image display surface. According to the portable telephone of a sliding type, it is possible to selectively display, on the second liquid crystal display panel, an image indicative of an operation key for a number input and an image indicative of an operation key for a character input. A user can input various signals to the portable telephone by operating the inputting touch panel while seeing the image of the operation key displayed on the second liquid crystal display panel. According to the portable telephone of a sliding type, therefore, it is possible to eliminate a deterioration in operability.

However, there is a possibility that a user might recognize only an image to be displayed on one image display panel not only in the case where one image display panel is provided, but also in the case where more than one image display panels are provided as described above. In the conventional portable telephone, therefore, there is a possibility that the user can recognize only a planar image.

In recent years, in the field of a portable electronic device having a liquid crystal display panel such as a portable telephone, it is expected that an image having a visual feature, for example, a three-dimensional image can be displayed.

SUMMARY OF THE INVENTION

It is an object of the present invention to provide a portable electronic device which has a high operability and is easy to carry, and more specifically, to provide a portable electronic device which has a wide image display surface of an image display panel provided on a device body and can display an image having a visual feature.

In order to attain the above object, a portable electronic device according to the present invention includes:
  a device body;
  a first image display panel provided on a front surface of the device body;
  a second image display panel disposed on the front surface of the device body and overlapping with an image display surface of the first image display panel; and
  a coupling portion for slidably coupling the second image display panel to the device body, to reciprocate the second image display panel along a predetermined path over the image display surface of the first image display panel,
  wherein the second image display panel has a structure in which light incident from a back surface side of the second image display panel is transmitted toward a side of an image display surface of the second image display panel, and the image display surface of at least one of the first image display panel and the second image display panel is provided with an inputting touch panel having a light transmittance while covering at least a partial region of the image display surface thereof.

BRIEF DESCRIPTION OF THE DRAWINGS

FIG. 50 is a block diagram showing a second variant of the portable telephone.

DETAILED DESCRIPTION OF EMBODIMENTS

The present invention will be specifically described below based on an embodiment of a portable telephone in conjunction with the drawings.

Figure 1:
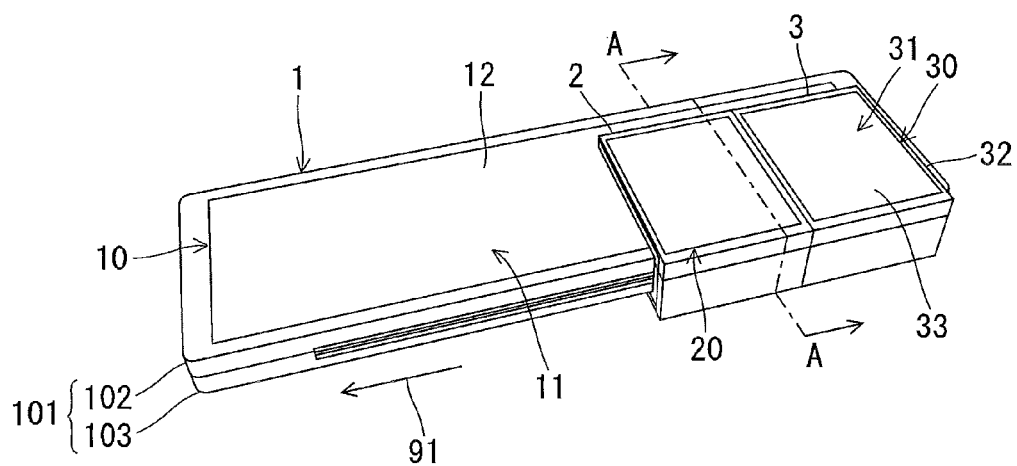
FIG. 1 is a perspective view showing a portable telephone according to an embodiment of the present invention.

FIG. 1 is a perspective view showing a portable telephone according to an embodiment of the present invention. As shown in FIG. 1, the portable telephone according to the present embodiment includes a device body 1 taking a shape of a rectangular parallelepiped having a small thickness. A cabinet 101 of the device body 1 is constituted by fitting a front surface side cabinet half-body 102 forming a front surface of the device body 1 and a back surface side cabinet half-body 103 forming a back surface of the device body 1 to each other.

On the device body 1 is provided a first liquid crystal display panel 10 serving as a first image display portion (a first image display panel) with an image display surface 11 of the first liquid crystal display panel 10 turned toward the front surface side of the device body 1. Moreover, the device body 1 is provided with a movable display portion 2 having a second liquid crystal display panel 20 serving as a second image display portion (a second image display panel) slidably coupled to the device body (1), a fixed display portion 3 having a third liquid crystal panel 30 serving as a third image display portion (a third image display panel) fixed to the device body 1, and a coupling portion 4 (not shown in FIG. 1) for slidably coupling the movable display portion 2 to the device body 1. On the back surface of the device body 1 is provided a camera, which is not shown.

On the image display surface 11 of the first liquid crystal display panel 10 is provided an inputting touch panel 12 having a light transmittance while covering at least a partial region of the image display surface 11. In the present embodiment, the inputting touch panel 12 does not need to be provided on a region of the image display surface 11 of the first liquid crystal display panel 10 with which the fixed display portion 3 overlaps.

As shown in FIG. 1, the fixed display portion 3 is disposed on an end portion at a right side of the device body 1 on the sheet of FIG. 1, and includes a third liquid crystal display panel 30 having an image display surface 31 with a smaller area than that of the image display surface 11 of the first liquid crystal display panel 10, and a fixing portion 32 for fixing the third liquid crystal display panel 30 to the device body 1. On the image display surface 31 of the third liquid crystal display panel 30 is provided an inputting touch panel 33 having a light transmittance while covering at least a partial region of the image display surface 31.

A part of the fixing display portion 3 overlapping with the image display surface 11 of the first liquid crystal display panel 10 has a light transmittance. More specifically, a part of the fixing portion 32 of the fixed display portion 3 overlapping with the image display surface 11 of the first liquid crystal panel 10 is formed of a material having the light transmittance.

Moreover, the third liquid crystal display panel 30 of the fixed display portion 3 has a structure in which light incident from the back surface side of the third liquid crystal display panel 30 is transmitted toward the side of the image display surface 31 of the third liquid crystal display panel 30. Although a specific structure of the third liquid crystal display panel 30 is not shown, the third liquid crystal display panel 30 has a liquid crystal sealed between two glass plates, a transparent electrode for applying voltage to the liquid crystal to control a direction of the liquid crystal, and a light source for causing light to be incident on the liquid crystal. The light source is disposed in a position at which the light source does not overlap with the sealed region of the liquid crystal, and light emitted from the light source is guided toward the back surface side of the liquid crystal by means of a light guiding sheet or the like and is thus incident on the liquid crystal.

In the case where light other than the light emitted from the light source of the third liquid crystal display panel 30, more specifically, light transmitted from the first liquid crystal display panel 10 is incident on the fixed display portion 3 from the back surface side thereof, the light is transmitted through the fixed display portion 3 unless the direction of the liquid crystal is controlled in the third liquid crystal display panel 30 to intercept the light.

Figure 2:
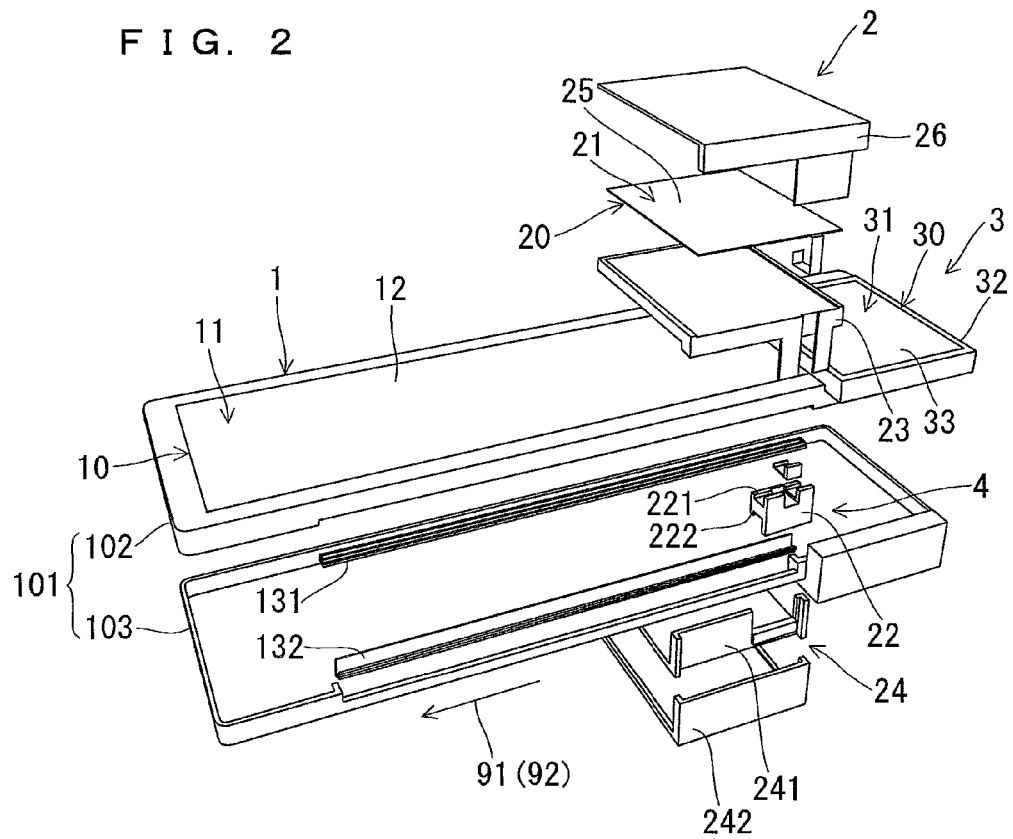
FIG. 2 is a partially exploded perspective view showing the portable telephone.
Figure 3:
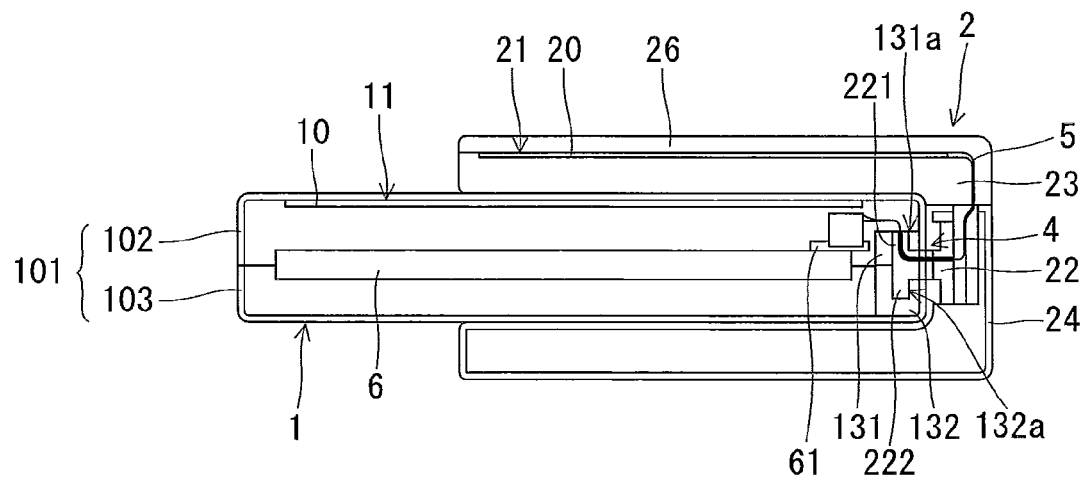
FIG. 3 is a sectional view taken along an A-A line illustrated in FIG. 1.

FIG. 2 is a partially exploded perspective view showing the portable telephone. Moreover, FIG. 3 is a sectional view taken along an A-A line illustrated in FIG. 1. As shown in FIGS. 2 and 3, the movable display portion 2 includes a second liquid crystal display panel 20 having an image display portion 21 with a smaller area than that of the image display surface 11 of the first liquid crystal display panel 10, a sliding portion 22 which is slidably coupled to the device body 1, a support table 23 which is fixed to the sliding portion 22 and serves to support the second liquid crystal display pane 20, and a back portion 24 which is fixed to the sliding portion 22 and overlaps with the back surface of the device body 1.

The image display surface 21 of the second liquid crystal display panel 20 is provided with an inputting touch panel 25 for covering at least a partial region of the image display surface 21 and a cover member 26 for covering a full region of the image display surface 21 from above the inputting touch panel 25. Herein, the inputting touch panel 25 has a light transmittance.

The support table 23 supports the second liquid crystal display panel 20 in such a manner that the second liquid crystal display panel 20 overlaps with the image display surface 11 of the first liquid crystal display panel 10 at a position on the front surface of the device body 1. Moreover, the back portion 24 is constituted by fitting two back portion constructing members 241, 242.

Herein, a portion of the movable display portion 2 which overlaps with the image display surface 11 of the first liquid crystal display panel 10 has a light transmittance. More specifically, the support table 23 of the movable display portion 2 and the cover member 26 are formed of materials having a light transmittance. Furthermore, the second liquid crystal display panel 20 of the movable display portion 2 has a structure in which light incident from the back surface side is transmitted toward the side of the image display surface 21 of the second liquid crystal display panel 20. More specifically, the second liquid crystal panel 20 of the movable display portion 2 has the same structure as that of the third liquid crystal display panel 30 of the fixed display portion 3. On the other hand, the back portion 24 of the movable display portion 2 is formed of a material which rarely has a light transmittance.

It is a matter of course that the second liquid crystal display panel 20 and the third liquid crystal display panel 30 have different structures from each other.

In the case where light other than the light emitted from the light source of the second liquid crystal display panel 20, more specifically, light transmitted from the first liquid crystal display panel 10 is incident on the movable display portion 2 from the back surface side thereof, accordingly, the light is transmitted through the movable display portion 2 unless the direction of the liquid crystal is controlled in the second liquid crystal display panel 20 to intercept the light.

Figure 25:
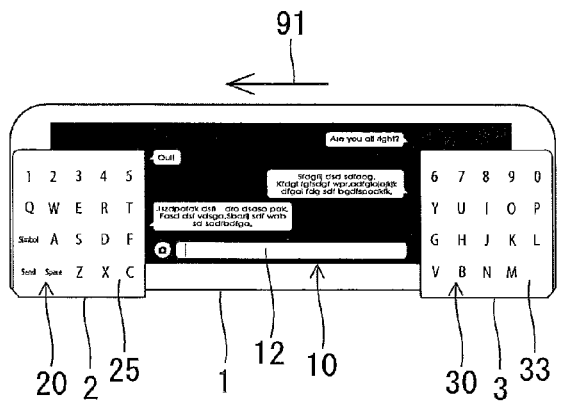
FIG. 25 is a view showing a display configuration of an image in the return of the electronic mail.

The movable display portion 2 can be reciprocated between an abutting position at which the movable display portion 2 abuts on the fixed displaying portion 3 as shown in FIG. 1 and a separating position at which the movable display portion 2 is disposed on an end portion at a left side of the device body 1 apart from the fixed display portion 3 as shown in FIG. 25.

More specifically, as shown in FIGS. 2 and 3, the sliding portion 22 of the movable display portion 2 is provided with a pair of upper and lower engaging portions 221, 222 protruded therefrom, while the device body 1 is provided with a pair of upper and lower guide rails 131, 132, and the pair of guide rails 131, 132 are provided with engagement receiving portions 131a, 132a, respectively, with which the pair of engaging portions 221, 222 of the sliding portion 22 are to be slidably engaged. The coupling portion 4 is constituted by the pair of engaging portions 221, 222 and the pair of engagement receiving portion 131a, 132a.

Herein, the pair of guide rails 131, 132 extend straight in a longitudinal direction of the device body 1 respectively, and the engagement receiving portions 131a, 132a are formed in an extending direction 92 of the pair of guide rails 131, 132, respectively. Accordingly, the sliding portion 22 has a sliding direction defined in the longitudinal direction 91 of the device body 1.

Therefore, the movable display portion 2 can reciprocate in the longitudinal direction of the device body 1 between the abutting position and the separating position. Thus, the second display panel 20 of the movable display portion 2 is slidably coupled to the device body 1 and can thus reciprocate along a predetermined path over the image display surface 11 of the first liquid crystal display panel 10. The predetermined path is defined in the same direction as the sliding direction of the sliding portion 22, that is, the longitudinal direction 91 of the device body 1.

When the movable display portion 2 is set into the abutting position as shown in FIG. 1, moreover, the second liquid crystal display panel 20 and the third liquid crystal display panel 30 are set into a closing state in which they are close to each other or in contact with each other over the image display surface 11 of the first liquid crystal display panel 10. On the other hand, when the movable display portion 2 is set into the separating position as shown in FIG. 25, the second liquid crystal display panel 20 and the third liquid crystal display panel 30 are set into an opening state in which they are opened apart from each other over the image display surface 11 of the first liquid crystal display panel 10.

In the coupling portion 4, the engagement receiving portion 131a provided in the upper guide rail 131 penetrates to an upper surface of the guide rail 131, and the upper engaging portion 221 of the sliding portion 22 is exposed from the upper surface.

As shown in FIG. 3, the device body 1 includes a circuit board 6 for controlling the device operations of the portable telephone, such as the image display operations of the first liquid crystal display panel 10, the second liquid crystal display panel 20 and the third liquid crystal display panel 30. On the circuit board 6 is mounted a connector 61, and to the connector 61 is electrically connected a flexible lead 5 pulled out of the second liquid crystal display panel 20 of the movable display portion 2. In FIG. 3, a wiring state of the flexible led 5 is simplified and shown. The specific wiring state of the flexible lead 5 will be descried below in detail.

The first liquid crystal display panel 10 and the third liquid crystal display panel 30 of the fixed display portion 3 are further connected electrically to the circuit board 6 by wiring means such as a flexible lead, which is not shown.

Figure 4:
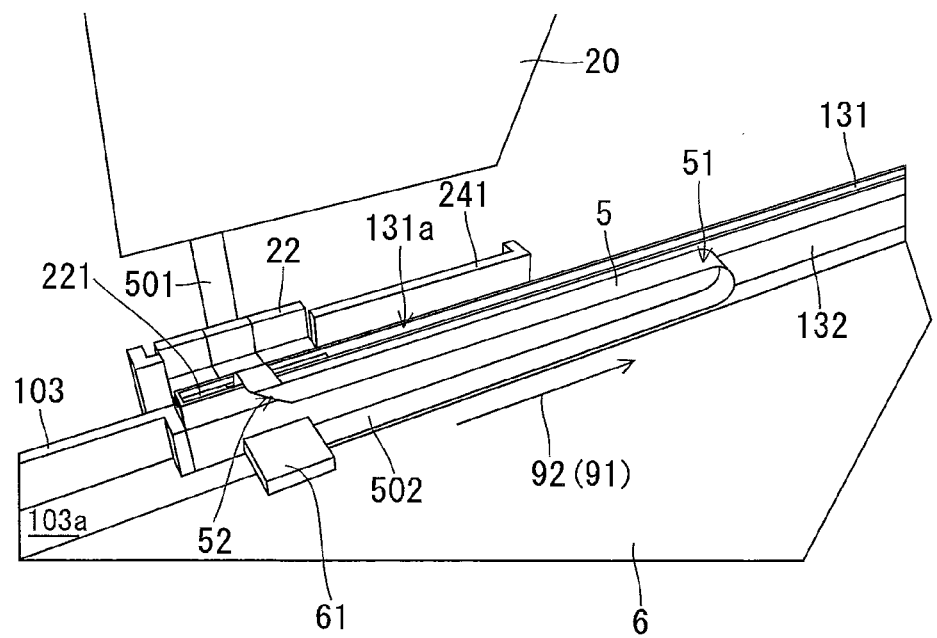
FIG. 4 is a perspective view showing a wiring state of a flexible lead connecting a circuit board to a second liquid crystal display panel of a movable display portion and a fifth step in a method of assembling the movable display portion.

FIG. 4 is a perspective view showing the wiring state of the flexible lead 5 connecting the circuit board 6 to the second liquid crystal display panel 20 of the movable display portion 2. As shown in FIG. 4, the flexible lead 5 is flat and long, which is connected to the connector 61 on the circuit board 6, and furthermore, is pulled from the connector 61 to an outside of the circuit board 6. The flexible lead 5 extends in the extending direction 92 of the guide rails 131, 132 with a planar surface of the flexible lead 5 extending along an internal surface 103a of the back surface side cabinet half-body 103, and is then bent like a U shape and extends toward a reverse side of the extending direction 92. Thereafter, the flexible lead 5 is bent like an L shape and extends in almost parallel with the internal surface 103a in an almost perpendicular direction to the extending direction 92, and subsequently passes through an inside of the engagement receiving portion 131a of the upper guide rail 131. In addition, the flexible lead 5 is guided from a tip surface of the upper engaging portion 221 of the sliding portion 22 into the sliding portion 22, and an end 501 of the flexible lead 5 is pulled out of a side surface at an outside of the sliding portion 22 and is thus coupled to the second liquid crystal display panel 20. In this way, the flexible lead 5 has a U-shaped bent portion 51 which is bent like a U shape and an L-shaped bent portion 52 which is bent like an L shape.

When the movable display portion 2 moves so that the second liquid crystal display panel 20 moves in the longitudinal direction 91 of the device body 1 (the same direction as the extending direction 92 of the guide rails 131 and 132), accordingly, the U-shaped bent portion 51 of the flexible lead 5 correspondingly moves in the same direction as the moving direction of the second liquid crystal display panel 20. Therefore, the flexible lead 5 does not inhibit the movement of the second liquid crystal display panel 20.

Figure 5:
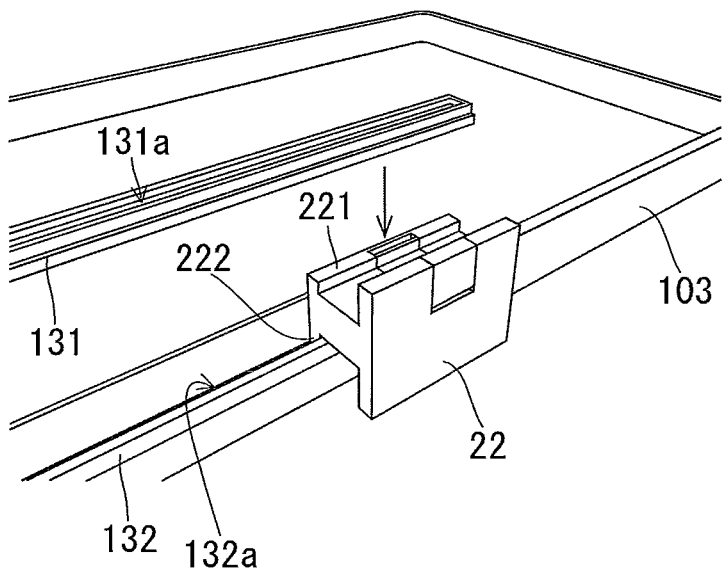
FIG. 5 is a perspective view showing a first step in the method of assembling the movable displaying portion.
Figure 6:
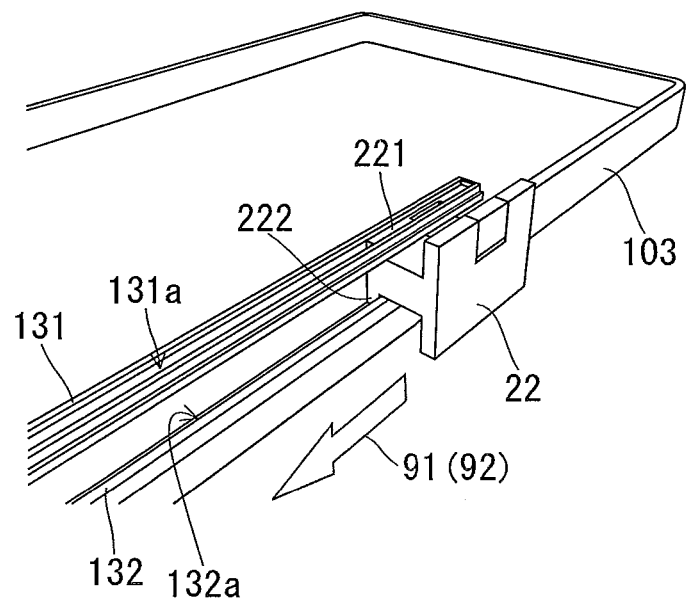
FIG. 6 is a perspective view showing a second step in the assembling method.

A method for assembling the movable display portion 2 will be specifically described with reference to FIGS. 4 to 13. First of all, as shown in FIG. 5, the lower engaging portion 222 of the sliding portion 22 is engaged with the engagement receiving portion 132a of the lower guide rail 132 provided on the back surface side cabinet half-body 103 in a first step. As shown in FIG. 6, then, the upper guide rail 131 is fitted to the lower guide rail 132, and furthermore, the upper engaging portion 221 of the sliding portion 22 is engaged with the engagement receiving portion 131a of the upper guide rail 131 in a second step. Consequently, the sliding portion 22 is slidably coupled to the device body 1 and a sliding direction thereof is defined in the longitudinal direction 91 of the device body 1 (the same direction as the extending direction 92 of the guide rails 131, 132) by means of the pair of guide rails 131, 132. Thus, the coupling portion 4 is formed.

Figure 7:
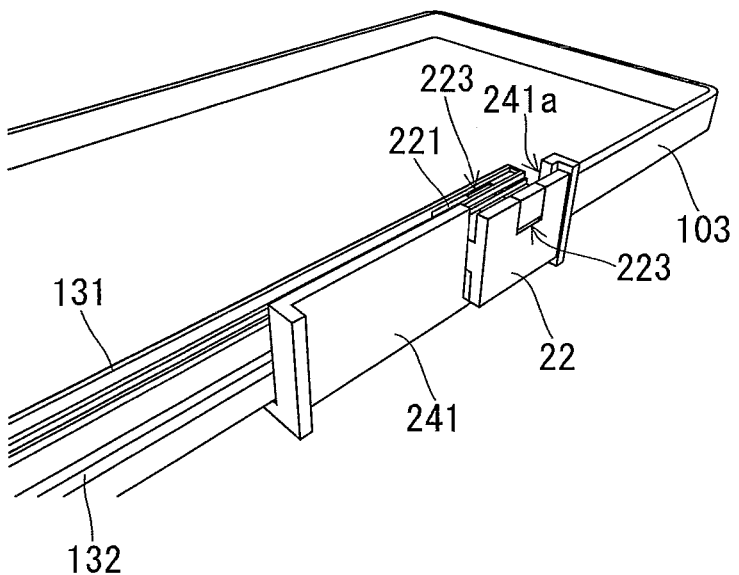
FIG. 7 is a perspective view showing a third step in the assembling method.

As shown in FIG. 7, next, the back constituting member 241 disposed inside the back constituting member 242, both of the two back constituting members 241, 242 constituting the back portion 24 of the movable display portion 2, is fixed to the sliding portion 22 in a third step. More specifically, on the internal back constituting member (241) is formed a concave portion 241a into which the sliding portion 22 is to be fitted. Thus the sliding portion 22 is fitted in the concave portion 241a, so that the internal back constituting member 241 is fixed to the sliding portion 22.

Figure 8:
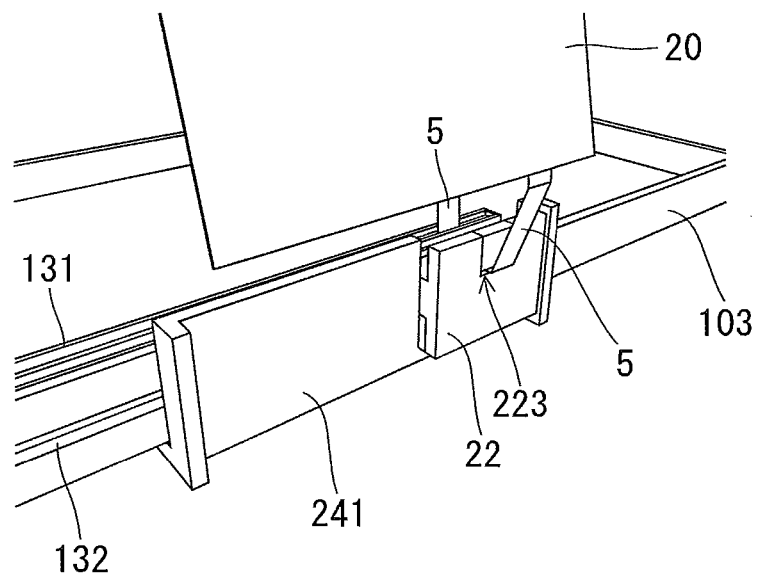
FIG. 8 is a perspective view showing a fourth step in the assembling method.
Figure 9:
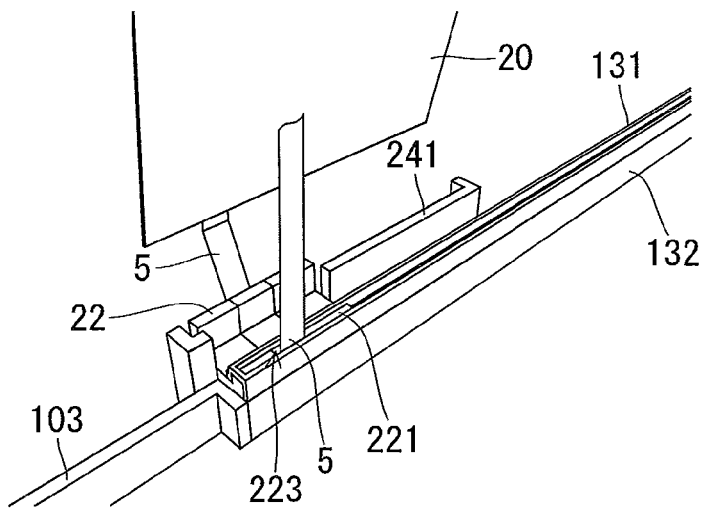
FIG. 9 is a perspective view showing the fourth step in the assembling method, the view seen from an inside of a back surface side cabinet half-body.

As shown in FIGS. 8 and 9, then, the flexible lead 5 pulled out of the second liquid crystal display panel 20 is guided to an inside of the back surface side cabinet half-body 103 by utilizing the sliding portion 22 in a fourth step. More specifically, through the sliding portion 22 is formed a through hole 223 leading from a side surface at the outside of the sliding portion 22 to a tip surface of the upper engaging portion 221 (also see FIG. 7), and the flexible lead (5) is inserted into the through hole 223 from the side surface side at the outside of the sliding portion 22 and is thus pulled out of the tip surface of the upper engaging portion 221.

As shown in FIG. 4, next, the U-shaped bent portion 51 and the L-shaped bent portion 52 are formed on the flexible lead 5, and furthermore, an end 502 of the flexible lead 5 is connected to the connector 61 provided on the circuit board 6 in a fifth step.

Figure 10:
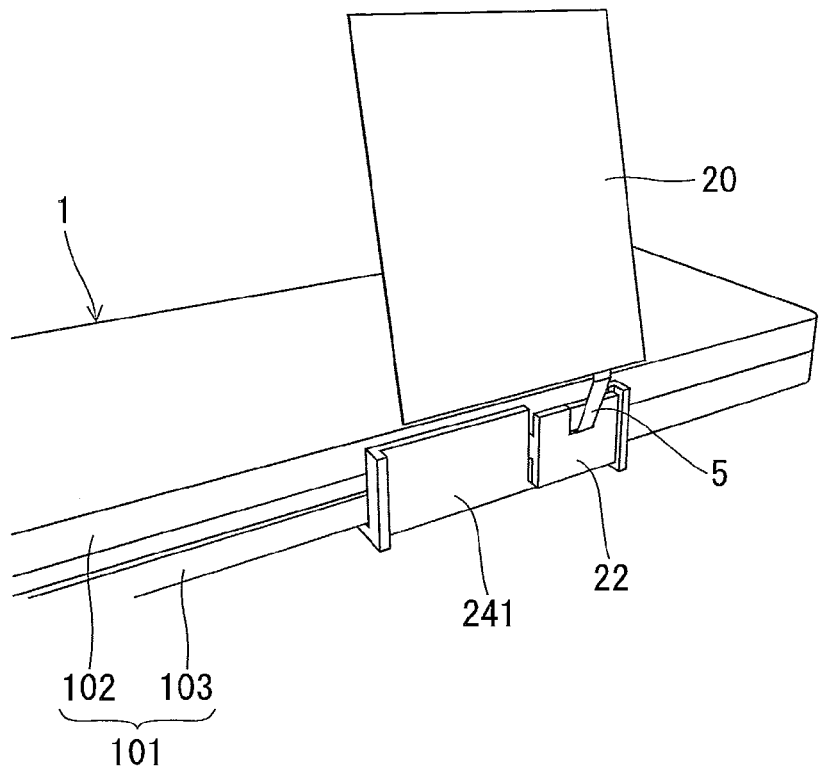
FIG. 10 is a perspective view showing a sixth step in the assembling method.
Figure 11:
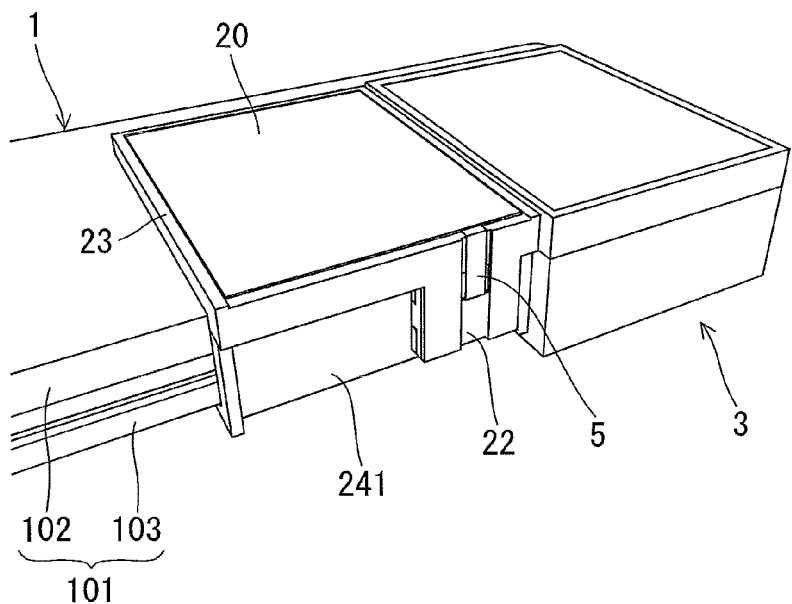
FIG. 11 is a perspective view showing a seventh step in the assembling method.

As shown in FIG. 10, subsequently, the front surface side cabinet half-body 102 is fitted to the back surface side cabinet half-body 103 to form the cabinet 101 of the device body 1 in a sixth step. As shown in FIG. 11, then, the support table 23 is fixed to the sliding portion 22 and the second liquid crystal display panel 20 is thereafter disposed on the support table 23 in a seventh step.

Figure 12:
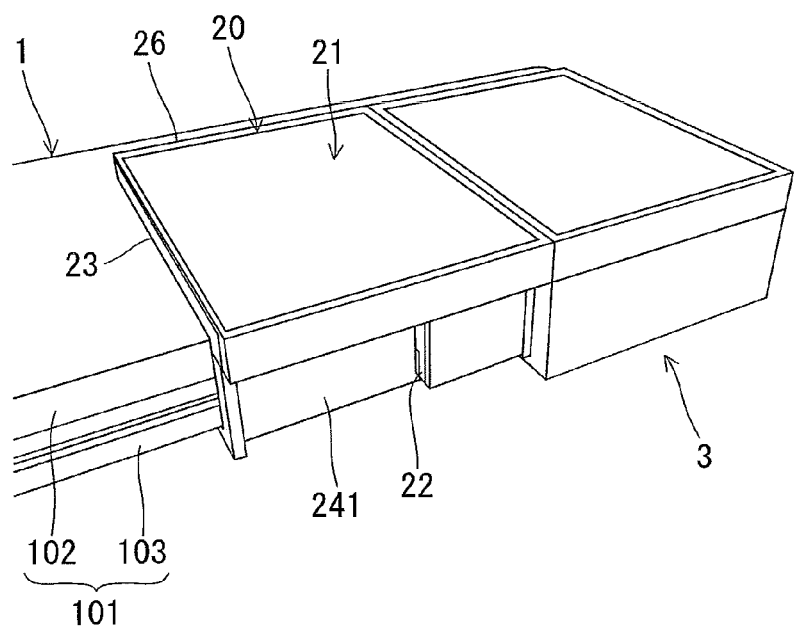
FIG. 12 is a perspective view showing an eighth step in the assembling method.
Figure 13:
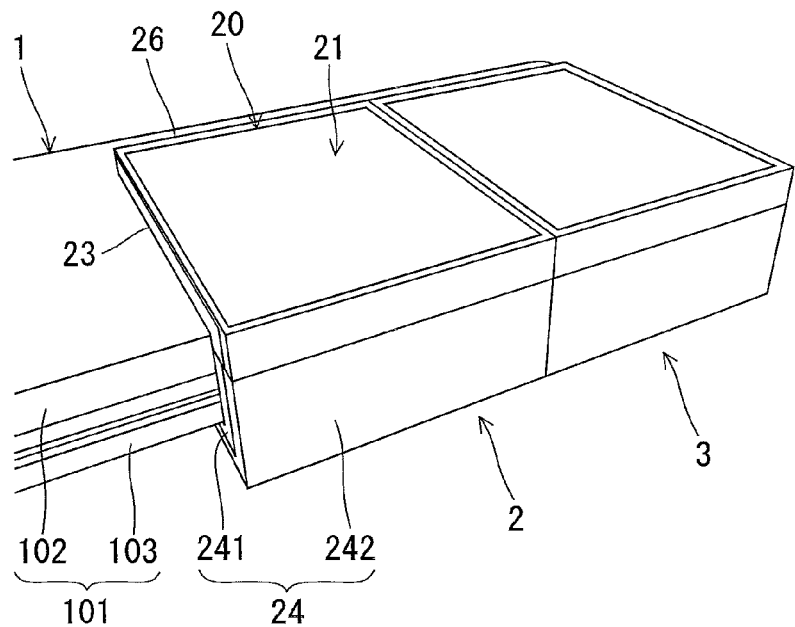
FIG. 13 is a perspective view showing a ninth step in the assembling method.

As shown in FIG. 12, next, the cover member 26 is attached to the support table 23 to cover a full region of the image display surface 21 of the second liquid crystal display panel 20 with the cover member 26 in an eighth step. As shown in FIG. 13, subsequently, the back constructing member 242 disposed outside the back constructing member 241, both of the two back constructing members 241, 242 constituting the back portion 24 of the movable display portion 2, is attached to the internal back constructing member 241 to form the back portion 24 of the movable display portion 2 in a ninth step. Consequently, the movable display portion 2 is assembled completely.

In the portable telephone, it is possible to allow a user to recognize an image to be displayed on the image display surface 11 of the first liquid crystal display panel 10 through the movable display portion 2 and the fixed display portion 3. Therefore, it is also possible to dispose the first liquid crystal display panel 10 on a region of the front surface of the display body 1 with which the movable display portion 2 and the fixed display portion 3 overlap. As shown in FIG. 1, accordingly, a wide range of the front surface of the device body 1 can be used as the region on which the first liquid crystal display panel 10 is to be provided. Therefore, the first liquid crystal display panel 10 having the wide image display surface 11 can be provided on the portable telephone.

In the portable telephone, furthermore, it is also possible to allow the user to recognize an image to be displayed on the image display surfaces 21, 31 of the second liquid crystal display panel 20 and the third liquid crystal display panel 30, and to recognize an image to be displayed on the image display surface 11 of the first liquid crystal display panel 10 through the second liquid crystal display panel 20 and the third liquid crystal display panel 30. Therefore, it is possible to overlap two images displayed on the first liquid crystal display panel 10 and the second liquid crystal display panel 20 and third liquid crystal display panel 30, to form a single image having a visual feature (for example, an image having a three-dimensionality), which allows the user to recognize the image.

In the portable telephone, moreover, the second liquid crystal display panel 20 of the movable display portion 2 is slidable along a predetermined path over the image display surface 11 of the first liquid crystal display panel 10. Accordingly, it is possible to form an image having a visual feature at various positions on the predetermined path.

The portable telephone is provided with three inputting touch panels 12, 25, 33, and the user can operate the inputting touch panels 12, 25, 33 to input an operation signal to the portable telephone.

Figure 15:
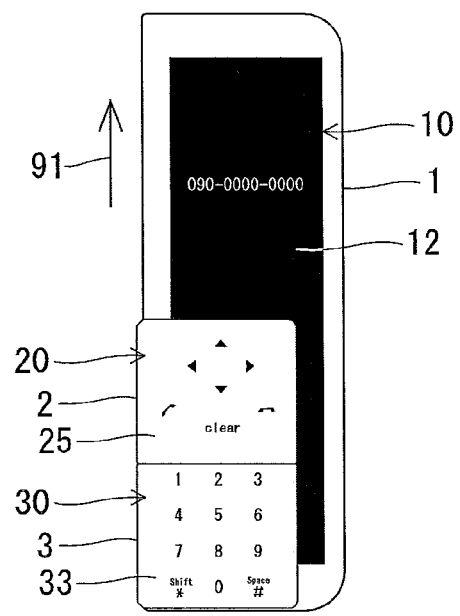
FIG. 15 is a view showing a display configuration of an image for inputting a telephone number.

In the case where the movable display portion 2 is set into the abutting position as shown in FIG. 1 in the portable telephone, that is, in the case where the second liquid crystal display panel 20 and the third liquid crystal display panel 30 are set into the closing state, furthermore, the user can hold the portable telephone by one hand, thereby operating the inputting touch panels 25, 33 on the second liquid crystal display panel 20 and the third liquid crystal display panel 30 by the other hand. At this time, a standard posture possessed by the portable telephone is a vertical orientation in which the longitudinal direction 91 of the device body 1 is turned vertically as shown in FIG. 15.

On the other hand, in the case where the movable display portion 2 is set into the separating position as shown in FIG. 25, that is, in the case where the second liquid crystal display panel 20 and the third liquid crystal display panel 30 are set into the opening state, the user can hold the portable telephone by both hands, and can operate the inputting touch panels 25, 33 provided on the second liquid crystal display panel 20 and the third liquid crystal display panel 30 by left and right hands, respectively. At this time, the standard posture possessed by the portable telephone is a lateral orientation in which the longitudinal direction 91 of the device body 1 is turned laterally as shown in FIG. 25.

According to the portable telephone, even if the second liquid crystal display panel 20 and the third liquid crystal display panel 30 are set into the closing state or the opening state, the second liquid crystal display panel 20 and the third liquid crystal display panel 30 are maintained in an overlapping with the image display surface 11 of the first liquid crystal display panel 10. Also in the case where the states of the second liquid crystal display panel 20 and the third liquid crystal display panel 30 are changed, accordingly, the size of the portable telephone is rarely varied. Therefore, the portable telephone is easy to carry irrespective of the states of the second liquid crystal display panel 20 and the third liquid crystal display panel 30.

Figure 14:
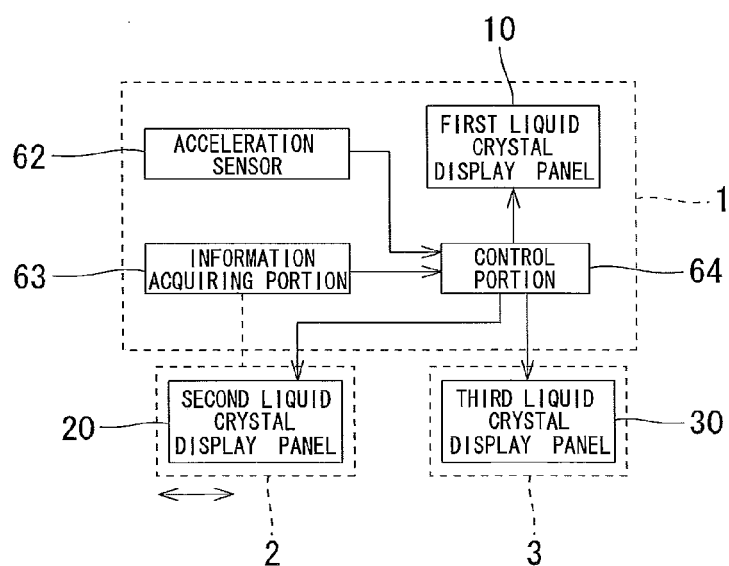
FIG. 14 is a block diagram showing a structure related to an image displaying operation of the portable telephone.

FIG. 14 is a block diagram showing a structure related to an image displaying operation of the portable telephone. As shown in FIG. 14, the device body 1 of the portable telephone is further provided with an acceleration sensor 62 for detecting the posture of the device body 1, an information acquiring portion 63 for acquiring information about a movement quantity to be varied depending on a movement quantity of the movable display portion 2 (that is, a movement quantity of the second liquid crystal display panel 20), and a control portion 64 for controlling the image displaying operations of the first liquid crystal display panel 10, the second liquid crystal display panel 20 and third liquid crystal display panel 30. Herein, the movement quantity of the second liquid crystal display panel 20 represents a distance from a predetermined position on a predetermined path along which the second liquid crystal display panel 20 can reciprocate. Moreover, the acceleration sensor 62, the information acquiring portion 63 and the control portion 64 are formed on the circuit board 6.

The acceleration sensor 62, the information acquiring portion 63 and the control portion 64 may be formed on different portions from the circuit board 6. Moreover, various posture detecting portions for detecting the posture of the device body 1 may be employed in place of the acceleration sensor 62.

The control portion 64 controls the image displaying operations of the first liquid crystal display panel 10, the second liquid crystal display panel 20 and the third liquid crystal display panel 30 based on the posture of the device body 1 detected by the accelerator sensor 62 and the information about the movement quantity acquired by the information acquiring portion 63.

In the case where the posture of the device body 1 is detected by the accelerator sensor 62, the control portion 64 changes the orientations of the images to be displayed on the first liquid crystal display panel 10, the second liquid crystal display panel 20 and the third liquid crystal display panel 30 depending on the posture of the device body 1. At this time, the control portion 64 functions as a changing portion for changing the orientations of the images.

More specifically, the control portion 64 displays the images on the first liquid crystal display panel 10, the second liquid crystal display panel 20 and the third liquid crystal display panel 30 in an orientation depending on the standard posture possessed by the portable telephone when the user holds the portable telephone. More specifically, when the user holds the portable telephone by one hand so that the standard posture possessed by the portable telephone is turned into the vertical posture, the control portion 64 causes the orientations of the images to be displayed on the first liquid crystal display panel 10, the second liquid crystal display panel 20 and the third liquid crystal display panel 30 to be almost coincident with the longitudinal direction 91 of the device body 1 as shown in FIG. 15. On the other hand, when the user holds the portable telephone by both hands so that the standard posture possessed by the portable telephone is turned laterally, the control portion 64 causes the orientations of the images to be displayed on the first liquid crystal display panel 10, the second liquid crystal display panel 20 and the third liquid crystal display panel 30 to be almost coincident with a perpendicular direction to the longitudinal direction 91 of the device body 1 as shown in FIG. 25. Irrespective of a using configuration of the portable telephone by the user, consequently, the images are displayed vertically with respect to the user on the first liquid crystal display panel 10, the second liquid crystal display panel 20 and the third liquid crystal display panel 30.

According to the portable telephone, therefore, the user can easily carry out the operation while seeing the image also in both the case where the inputting touch panels 12, 25, 33 are operated by one hand and the case where the inputting touch panels 12, 25, 33 are operated by both hands. Therefore, the portable telephone has a high operability.

In the case where the information acquiring portion 63 acquires the movement quantity information, furthermore, the control portion 64 displays various images on the first liquid crystal display panel 10, the second liquid crystal display panel 20 and the third liquid crystal display panel 30 depending on a movement quantity corresponding to the movement quantity information. Consequently, the portable telephone has a higher operability. A specific example of a display configuration of an image corresponding to a movement quantity will be described below.

According to the information acquiring portion 63 and the control portion 64, moreover, the movable display portion 2 (that is, the second liquid crystal display panel 20) can be caused to function as an operation portion for operating the images displayed on the first liquid crystal display panel 10, the second liquid crystal display panel 20 and the third liquid crystal display panel 30.

Next, a specific example of a display configuration of an image which is feasible for the portable telephone will be described with reference to the drawings. Herein, the portable telephone can display different images from each other on the first liquid crystal display panel 10, the second liquid crystal display panel 20 and the third liquid crystal display panel 30, and furthermore, can implement a multitask function for causing the first liquid crystal display panel 10, the second liquid crystal display panel 20 and the third liquid crystal display panel 30 to exhibit different functions from each other.

FIG. 15 is a view showing a display configuration of an image for inputting a telephone number. As shown in FIG. 15, in the display configuration, on the second liquid crystal display panel 20 of the movable display portion 2 are displayed an operation key for an outgoing call, an operation key for a selection and the like, and on the third liquid crystal display panel 30 of the fixed display portion 3 is displayed an operation key for a numerical input. Moreover, on the first liquid crystal display panel 10 is displayed a telephone number input by operating the inputting touch panel 33 by the user.

Figure 16:
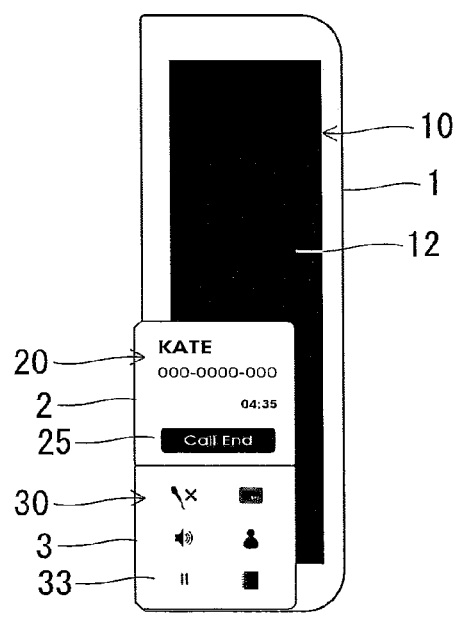
FIG. 16 is a view showing a display configuration of an image in a telephone call.

FIG. 16 is a view showing a display configuration of an image in a telephone call. As shown in FIG. 16, in the display configuration, on the second liquid crystal display panel 20 of the movable display portion 2 are displayed information about a telephone number, a name or the like of the other person in the telephone call and a calling duration, and on the third liquid crystal display panel 30 of the fixed display portion 3 is displayed an operation key for a volume control in a telephone call or the like. On the second liquid crystal display panel 20 and the third liquid crystal display panel 30 may be displayed an animation as a background. Moreover, on the first liquid crystal display panel 10 may be displayed an image of a face of the other person in the telephone call. It is possible to reduce a power consumption by stopping a supply of power to the first liquid crystal display panel 10 without displaying an image on the first liquid crystal display panel 10 as shown in FIG. 16.

Figure 17:
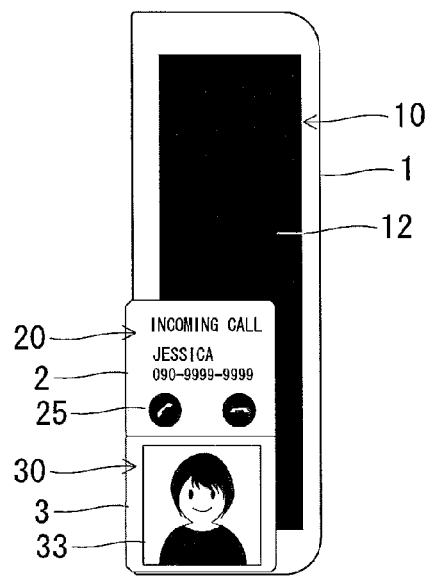
FIG. 17 is a view showing an example of a display configuration of an image in an incoming call arrival.

FIG. 17 is a view showing an example of a display configuration of an image in an incoming call arrival. In the case where information about a telephone number or a name of the other person (an originator) or the like and an image of a face of the other person are registered in the portable telephone, on the second liquid crystal display panel 20 of the movable display portion 2 are displayed the information about the other person, an operation key for starting a telephone call and the like, and on the third liquid crystal display panel 30 of the fixed display portion 3 is displayed the image of the face of the other person registered as shown in FIG. 17. In consideration of operability for a user, the image of the face of the other person registered may be displayed on the second liquid crystal display panel 20 of the movable display portion 2 and the information about the other person, the operation key for starting a telephone call and the like may be displayed on the third liquid crystal display panel 30 of the fixed display portion 3. When the user holds the portable telephone by one hand, consequently, an operation screen is displayed at a close position to a thumb of the hand so that an image of a face of the other person is displayed at an apart position from the thumb of the hand.

Figure 18:
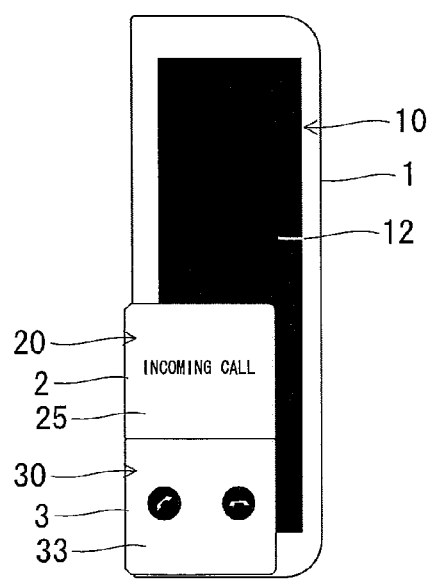
FIG. 18(a) is a view showing another example of the display configuration of the image in the incoming call arrival and FIG. 18(b) is a view to be used for explaining an operation which can be executed in the incoming call arrival.
Figure 18:
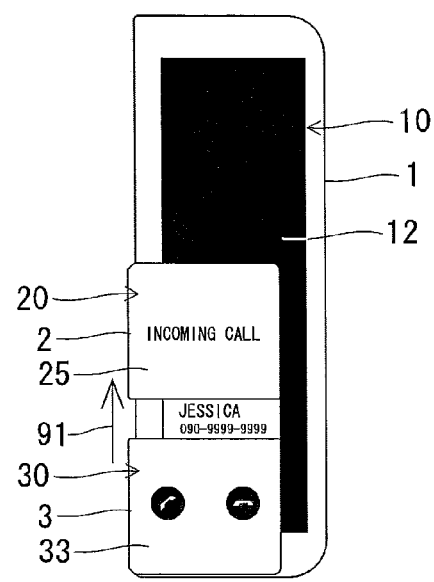

FIG. 18(a) is a view showing another example of the display configuration of the image in the incoming call arrival and FIG. 18(b) is a view to be used for explaining an operation which can be executed in the incoming call arrival. As shown in FIG. 18(a), in the display configuration according to another example, also in the case where information about the other person or the like is registered in the portable telephone, on the first liquid crystal display panel 10, the second liquid crystal display panel 20 and the third liquid crystal display panel 30, the information about the other person or the like is not displayed but only an image for giving a notice of an incoming call arrival and an operation key are displayed. Consequently, it is possible to prevent the information about the other person or the like from being recognized by a person other than the user in the incoming call.

As shown in FIG. 18(b), the user slides the movable display portion 2 in the longitudinal direction 91 of the device body 1 from the abutting position so that the information about the other person is displayed on a region of the first liquid crystal display panel 10 between an installation region for the fixed display portion 3 and a region with which the movable display portion 2 overlaps. In other words, only when the user executes the sliding operation, the information about the other person is displayed on the region. Accordingly, the user can confirm the information about the other person while maintaining a confidentiality of the information about the other person.

Figure 19:
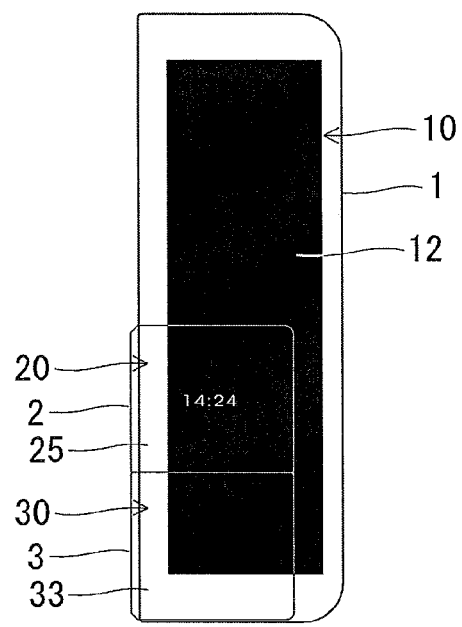
FIG. 19 is a view showing a display configuration of an image in an electric power saving mode.

FIG. 19 is a view showing a display configuration of an image in a power saving mode. In the case where the portable telephone is set into a standby state, a supply of power to the first liquid crystal display panel 10 is stopped, while the supply of power to the second liquid crystal display panel 20 and the third liquid crystal display panel 30 is maintained as shown in FIG. 19. On the second liquid crystal display panel 20 and the third liquid crystal display panel 30 is displayed a clock time, for example. On the second liquid crystal display panel 20 or the third liquid crystal display panel 30 may be displayed a pict, a shortcut icon, a menu, a widget or the like.

Figure 20:
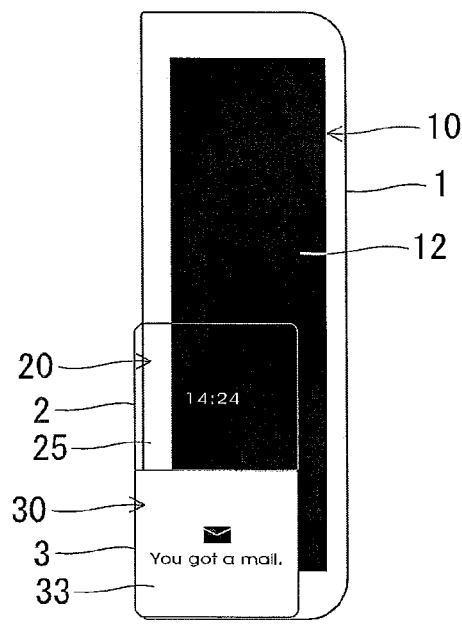
FIG. 20 is a view showing a display configuration of an image in a reception of an electronic mail.

FIG. 20 is a view showing a display configuration of an image in a receipt of an electronic mail. As shown in FIG. 20, in the display configuration, on the third liquid crystal display panel 30 of the fixed display portion 3 is displayed an image for giving a notice of the receipt of the electronic mail. In the case where the electronic mail is received when the portable telephone is maintained in the standby state (see FIG. 19), the image for giving a notice of the receipt of the electronic mail is pop-up displayed on the third liquid crystal display panel 30. At this time, the supply of power to the first liquid crystal display panel 10 is maintained to be stopped.

Figure 21:
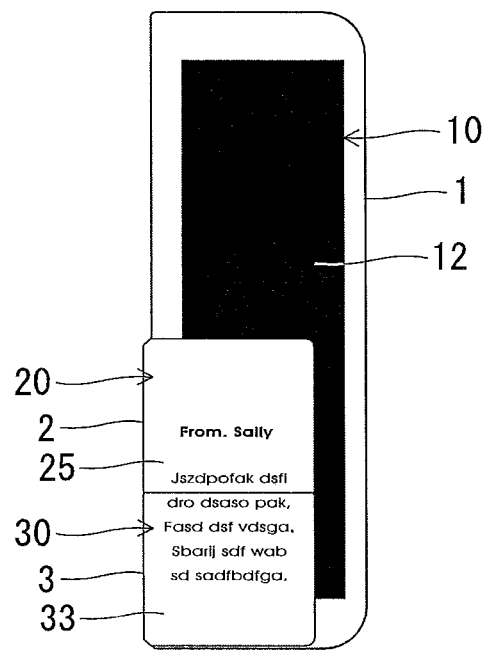
FIG. 21 is a view showing an example of a display configuration of a content of the received electronic mail.

FIG. 21 is a view showing an example of a display configuration of a content of the received electronic mail. When the user touches the inputting touch panel 33 provided on the third liquid crystal display panel 30 in the display configuration shown in FIG. 20 (for example, touches a displayed mail icon (mark)), the content of the received electronic mail is displayed on the second liquid crystal display panel 20 and the third liquid crystal display panel 30 as shown in FIG. 21. At this time, the supply of power to the first liquid crystal display panel 10 is maintained to be stopped.

Figure 22:
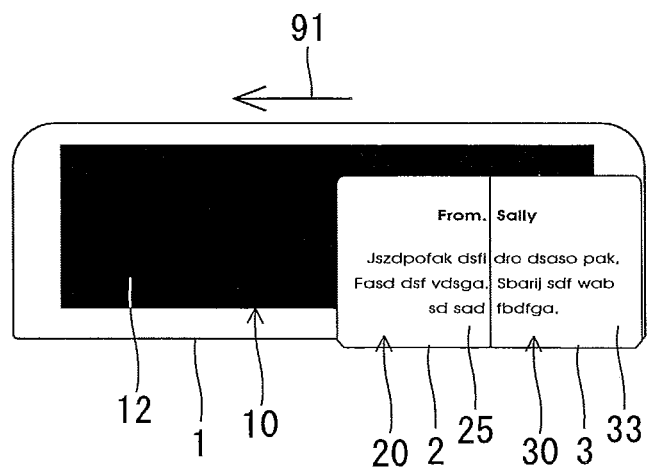
FIG. 22 is a view showing another example of the display configuration of the content of the received electronic mail.

FIG. 22 is a view showing another example of the display configuration of the content of the received electronic mail. In the case where the standard posture possessed by the portable telephone is lateral, on the second liquid crystal display panel 20 and the third liquid crystal display panel 30 is displayed an image indicative of the content of the received electronic mail in a state in which an orientation of the image is almost coincident with a perpendicular direction to the longitudinal direction 91 of the device body 1 as shown in FIG. 22. The display configuration shown in FIG. 21 and the display configuration shown in FIG. 22 are switched by changing the standard posture of the portable telephone between the vertical posture and the lateral posture by the user, and the switching of the display configuration is implemented by a detection of the posture of the portable telephone by the acceleration sensor 62.

Figure 23:
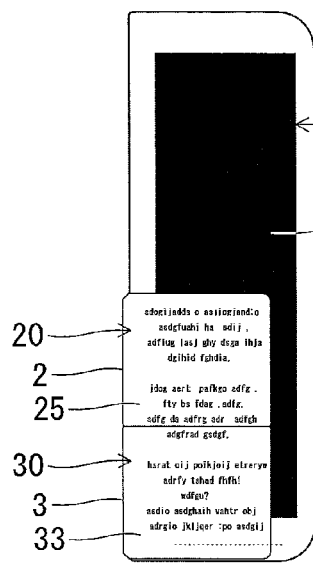
FIG. 23(a) is a view showing a configuration in which the content of the received electronic mail is simply displayed and FIG. 23(b) is a view to be used for explaining an operation which can be executed in a simple display.
Figure 23:
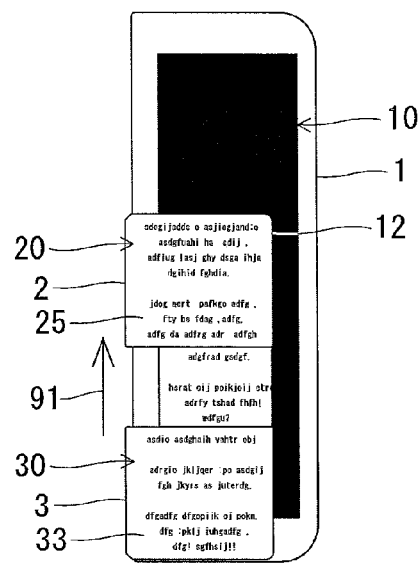

FIG. 23(a) is a view showing a configuration in which the content of the received electronic mail is displayed simply, and FIG. 23(b) is a view to be used for explaining an operation which can be executed in the simple display. Herein, the simple display indicates that a part of the content of the electronic mail is displayed on the liquid crystal display panel. When the user touches the inputting touch panel 33 provided on the third liquid crystal display panel 30 in the display configuration shown in FIG. 20, the content of the received electronic mail is simply displayed on the second liquid crystal display panel 20 and the third liquid crystal display panel 30 as shown in FIG. 23(a).

As shown in FIG. 23(b), the user slides the movable display portion 2 in the longitudinal direction 91 of the device body 1 from the abutting position so that the content of the electronic mail is also displayed on a region of the first liquid crystal display panel 10 between the installation region for the fixed display portion 3 and the region with which the movable display portion 2 overlaps depending on the movement quantity of the movable display portion 2 (that is, the movement quantity of the second liquid crystal display panel 20). Accordingly, the display region for simply displaying the content of the electronic mail is enlarged.

Figure 24:
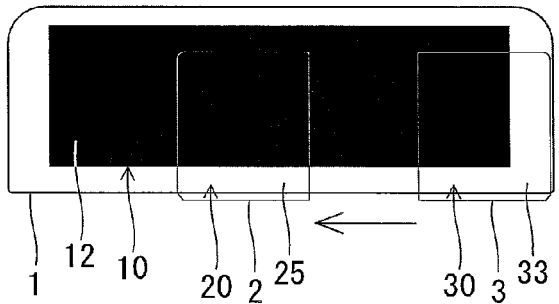
FIG. 24 is a view to be used for explaining an operation for displaying an image in a return of an electronic mail.

FIG. 24 is a view to be used for explaining an operation for displaying an image in a return of an electronic mail. As shown in FIG. 24, in the operation, a user slides the movable display portion 2 in the longitudinal direction 91 of the device body 1 from the abutting position to the separating position. Consequently, on the second liquid crystal display panel 20 and the third liquid crystal display panel 30 is displayed an operation key for inputting a character as shown in FIG. 25, and on the first liquid crystal display panel 10 are displayed characters input by operating the inputting touch panels 25, 33 on the second liquid crystal display panel 20 and the third liquid crystal display panel 30 by the user. A screen in the return of the electronic mail may be displayed when the user slides the movable display portion 2 from the abutting position to the separating position in the longitudinal direction 91 of the device body 1 in the display configuration shown in FIG. 23(b).

Figure 26:
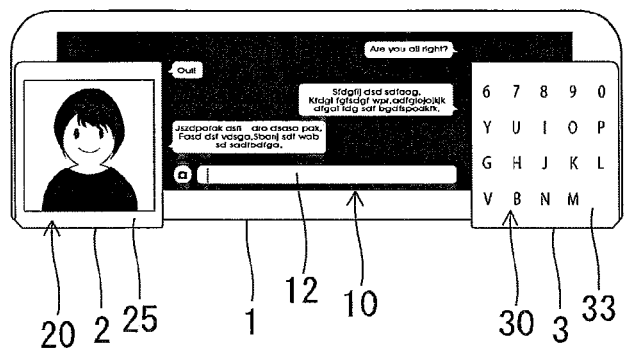
FIG. 26 is a view showing a display configuration of an image in a receipt of a message through a short message service (SMS).

FIG. 26 is a view showing a display configuration of an image in a receipt of a message through a short message service (SMS). As shown in FIG. 26, in the display configuration, on the first liquid crystal display panel 10 is displayed an image indicative of a content of the message and on the second liquid crystal display panel 20 of the movable display portion 2 is then displayed an image of a face of the other person for only several seconds. The image may be a static image, a dynamic image, and furthermore, an animation. The message may be displayed in a balloon format on the first liquid crystal display panel 10 while the image of the face of the other person is displayed. Consequently, it is possible to allow the user to recognize an image having a visual feature, thereby giving a feeling of an actual conversation with the other person.

Figure 27:
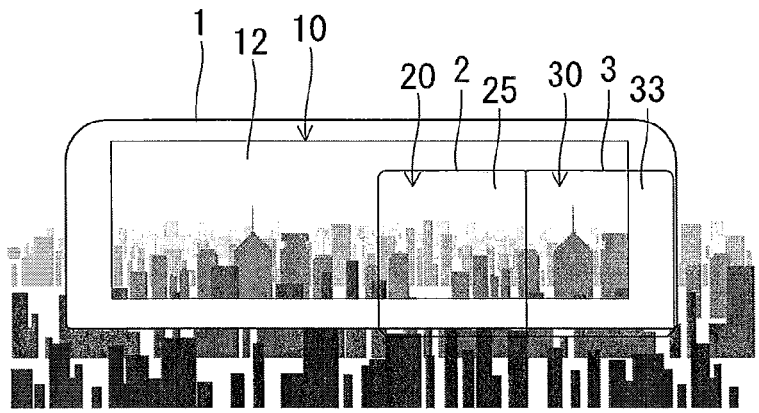
FIG. 27 is a view showing a display configuration of an image in camera photographing.

FIG. 27 is a view showing a display configuration of an image in camera photographing. As shown in FIG. 27, in the display configuration, on the first liquid crystal display panel 10 is displayed an image acquired by a camera. On the other hand, on the second liquid crystal display panel 20 and the third liquid crystal display panel 30 are not displayed images, and the second liquid crystal display panel 20 and the third liquid crystal display panel 30 are set into a transparent state in which light incident from a back surface side is transmitted to the image display surfaces 21, 31 (which will be hereinafter simply referred to as a "transparent state"). Also in the case where the image acquired by the camera is displayed on the whole first liquid crystal display panel 10, therefore, the user can visually recognize the whole image.

Figure 28:
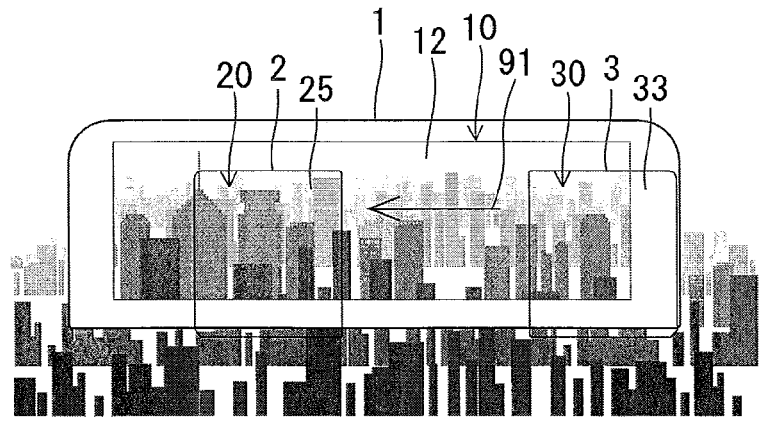
FIG. 28 is a view to be used for explaining an operation for regulating a zooming quantity in the camera photographing.

FIG. 28 is a view to be used for explaining an operation for regulating a zooming quantity in camera photographing. As shown in FIG. 28, in the operation, the user slides the movable display portion 2 in the longitudinal direction 91 of the device body 1 from the abutting position so that the zooming quantity of the camera is regulated depending on the movement quantity of the movable display portion 2 (that is, the movement quantity of the second liquid crystal display panel 20). As a result, on the first liquid crystal display panel 10 is displayed an enlarged image of a subject.

Figure 29:
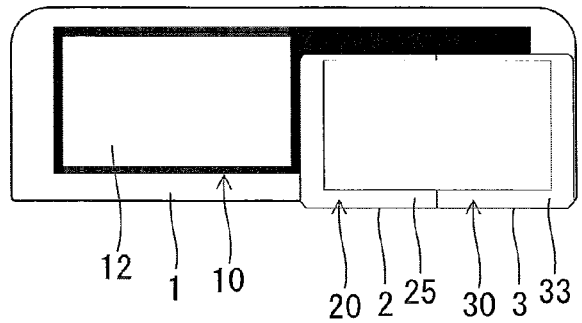
FIG. 29 is a view showing a display configuration of an image in simultaneous photographing of a dynamic image and a static image.

FIG. 29 is a view showing a display configuration of an image in the case where a dynamic image and a static image are photographed at the same time. As shown in FIG. 29, in the display configuration, the movable display portion 2 is set into the abutting position and one static image is displayed on the second liquid crystal display panel 20 and the liquid crystal display panel 30. On the other hand, a dynamic image is displayed on a region of the first liquid crystal display panel 10 with which the second liquid crystal display panel 20 and the third liquid crystal display panel 30 do not overlap. More specifically, when only the dynamic image is photographed, the dynamic image is displayed on a whole region of the first liquid crystal display panel 10, and the second liquid crystal display panel 20 and the third liquid crystal display panel 30 are set into a transparent state. In the case where the static image is acquired during the dynamic image photographing, one of images constituting the dynamic image is extracted as a static image through a touch with the inputting touch panels 25, 33 provided on the second liquid crystal display panel 20 and the third liquid crystal display panel 30, and the static image is displayed on the second liquid crystal display panel 20 and the third liquid crystal display panel 30.

Figure 30:
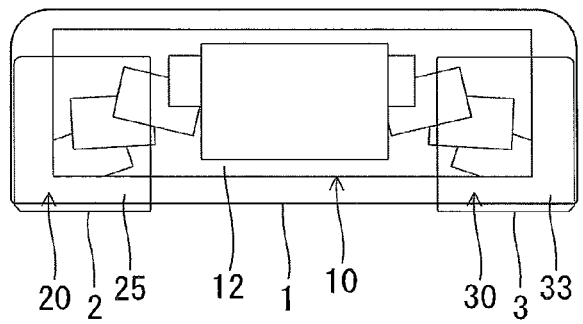
FIG. 30 is a view showing a display configuration of an image in data viewing.

FIG. 30 is a view showing a display configuration of an image in data viewing. As shown in FIG. 30, in the display configuration, on the first liquid crystal display panel 10 is arranged and displayed a plurality of images stored in a predetermined data folder in a line, and on a central region of the first liquid crystal display panel 10 is displayed one of the images in a large way. On the other hand, on the second liquid crystal display panel 20 and the third liquid crystal display panel 30 are not displayed images, and the second liquid crystal display pane 20 and the third liquid crystal display panel 30 are set into a transparent state.

Figure 31:
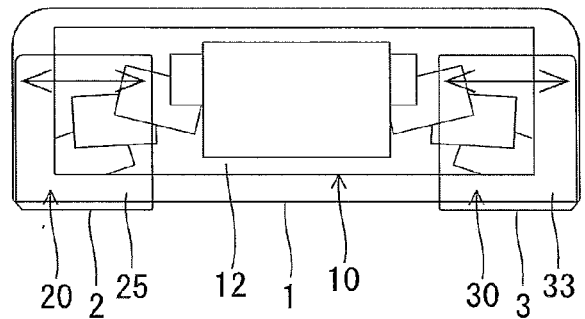
FIG. 31 is a view to be used for explaining an operation which can be executed in the data viewing.

FIG. 31 is a view to be used for explaining an operation which can be executed in the data viewing. As shown in FIG. 31, in the operation, the user transversely flicks the inputting touch panels 25, 33 provided on the second liquid crystal display panel 20 and the third liquid crystal display panel 30 so that an image to be displayed on the central region of the first liquid crystal display panel 10 is changed. More specifically, on the first liquid crystal display panel 10 are arranged and displayed a plurality of images in a line, and the image line flows in a direction in which the user carries out flicking so that the image to be displayed on the central region of the first liquid crystal display panel 10 is changed.

Figure 32:
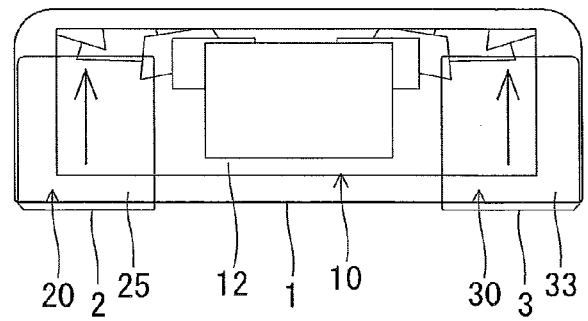
FIG. 32 is a view to be used for explaining another operation which can be executed in the data viewing.
Figure 33:
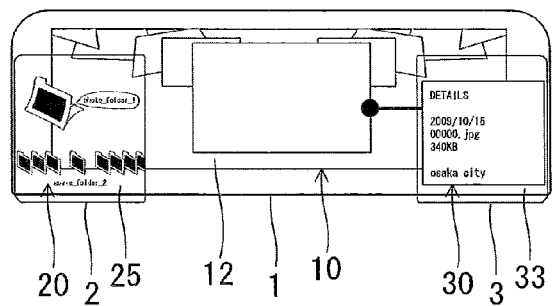
FIG. 33 is a view showing another example of the display configuration of the image in the data viewing.

FIG. 32 is a view to be used for explaining another operation which can be executed in the data viewing. As shown in FIG. 32, in the operation, the user flicks the inputting touch panels 25 and 33 provided on the second liquid crystal display panel 20 and the third liquid crystal display panel 30 in an upward direction so that an image other than the image displayed on the central region of the first liquid crystal display panel 10 moves in the upward direction. As shown in FIG. 33, on the second liquid crystal display panel 20 of the movable display portion 2 is displayed a list of a plurality of folders including the predetermined data folder, and on the third liquid crystal display panel 30 of the fixed display portion 3 is displayed detailed information of the image displayed on the central region of the first liquid crystal display panel 10. Consequently, on the first liquid crystal display panel 10, the second liquid crystal display panel 20 and the third liquid crystal display panel 30, respectively, data are hierarchically displayed.

Figure 34:
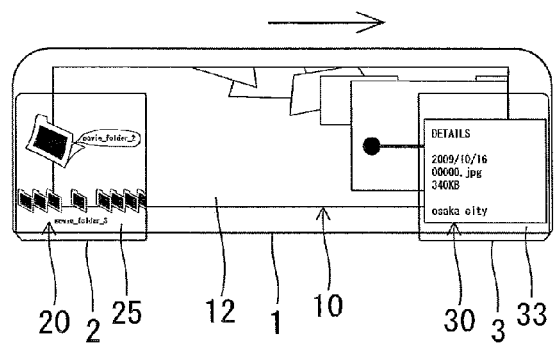
FIG. 34 is a view showing a display configuration of an image in a selection of another data folder.

FIG. 34 is a view showing a display configuration of an image in a selection of another data folder. In the display configuration shown in FIG. 33, the user operates the inputting touch panel 25 provided on the second liquid crystal display panel 20 to select a different data folder from the predetermined data folder so that the image line displayed on the first liquid crystal display panel 10 flows rightward and disappears from the screen as shown in FIG. 34. On the first liquid crystal display panel 10 are arranged and displayed a plurality of images stored in another data folder selected by the user in a line.

Figure 35:
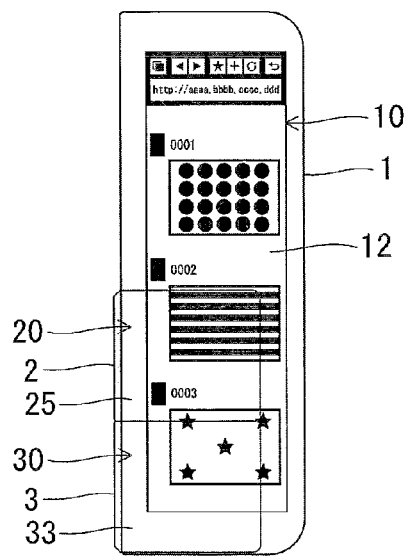
FIGS. 35(a) and 35(b) are views showing an example of a display configuration of an image (a web image) in web viewing.
Figure 35:
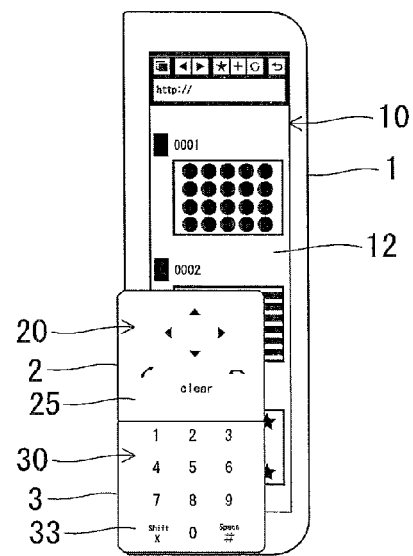

FIGS. 35(*a*) and 35(*b*) are views showing an example of a display configuration of an image in web viewing (a web image). As shown in FIG. 35(*a*), in the display configuration, the web image is displayed on the first liquid crystal display panel 10. On the other hand, on the second liquid crystal display panel 20 and the third liquid crystal display panel 30, an image is not displayed, and the second liquid crystal display panel 20 and the third liquid crystal display panel 30 are set into a transparent state. Also in the case where the web image is displayed on the whole first liquid crystal display panel 10, therefore, it is possible for the user to visually recognize the whole web image. As a matter of course, as shown in FIG. 35(*b*), a different image from the web image may be displayed on the second liquid crystal display panel 20 and the third liquid crystal display panel 30.

Figure 36:
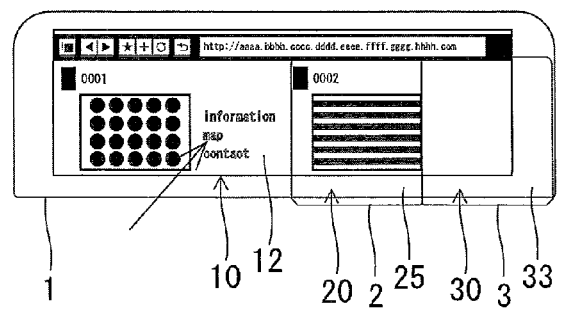
FIG. 36 is a view showing another example of a display configuration of a web image.

FIG. 36 is a view showing another example of the display configuration of the web image. As shown in FIG. 36, in the display configuration, on the first liquid crystal display panel 10 is displayed a web image which displays three selection keys of "information", "map" and "contact". On the other hand, on the second liquid crystal display panel 20 and the third liquid crystal display panel 30 are not displayed images, and the second liquid crystal display panel 20 and the third liquid crystal display panel 30 are set into the transparent state. Accordingly, the user can visually recognize the whole web image displayed on the first liquid crystal display panel 10.

Figure 37:
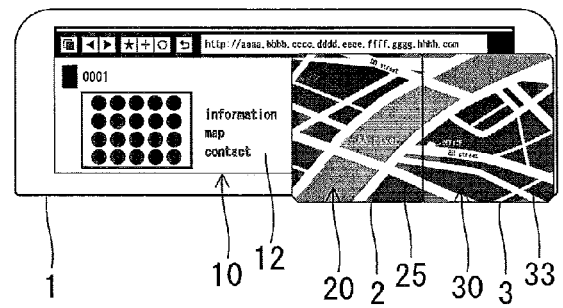
FIG. 37 is a view showing a display configuration of an image in a selection of a selection key on the web image.

FIG. 37 is a view showing a display configuration of an image in a selection of a selection key on the web image. As shown in FIG. 37, in the display configuration, the web image is displayed on the first liquid crystal display panel 10, while another web image linked to the selection key is displayed on the second liquid crystal display panel 20 and the third liquid crystal display panel 30. Consequently, two different web images can be viewed on two screens at the same time.

Figure 38:
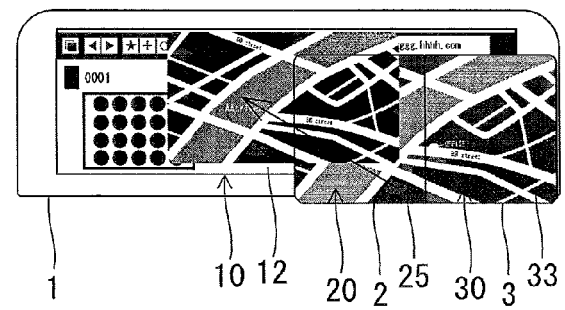
FIGS. 38(a) and 38(b) are views to be used for explaining an operation which can be executed in the web viewing.
Figure 38:
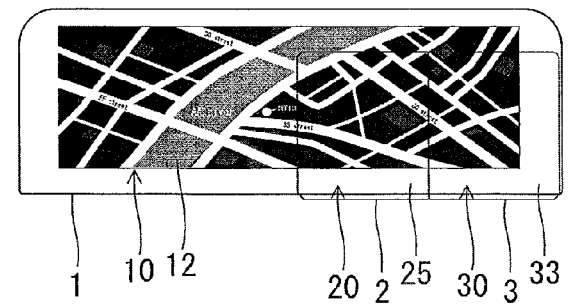

FIGS. 38(*a*) and 38(*b*) are views to be used for explaining an operation which can be executed in web viewing. As shown in FIG. 38(*a*), in the operation, the user operates the inputting touch panes 12, 25, 33 to move the web image displayed on the second liquid crystal display panel 20 and the third liquid crystal display panel 30 toward the side of the first liquid crystal display panel 10 so that the web image displayed on the second liquid crystal display panel 20 and the third liquid crystal display panel 30 is displayed on the whole first liquid crystal display panel 10 as shown in FIG. 38(*b*). On the other hand, the displayed web image is erased from the second liquid crystal display panel 20 and the third liquid crystal display panel 30 so that the second liquid crystal display panel 20 and the third liquid crystal display panel 30 are set into the transparent state.

Figure 39:
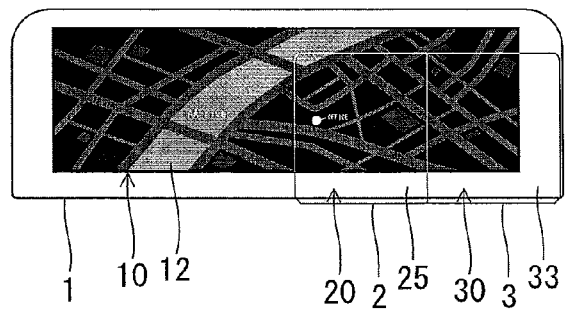
FIG. 39 is a view showing an example of a display configuration of an image (a map image) in map viewing.

FIG. 39 is a view showing an example of a display configuration of an image in map viewing (a map image). As shown in FIG. 39, in the display configuration, the map image is displayed on the first liquid crystal display panel 10. On the other hand, on the second liquid crystal display panel 20 and the third liquid crystal display panel 30 are not displayed images, and the second liquid crystal display panel 20 and the third liquid crystal display panel 30 are set into a transparent state. Also in the case where the map image is displayed on the whole first liquid crystal display panel 10, therefore, it is possible for the user to visually recognize the whole map image.

Figure 40:
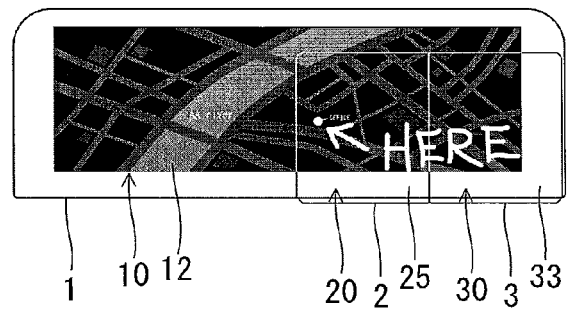
FIG. 40 is a view to be used for explaining an operation which can be executed in the map viewing.

FIG. 40 is a view to be used for explaining an operation which can be executed in the map viewing. As shown in FIG. 40, in the operation, the user operates the inputting touch panels 25, 33 provided on the second liquid crystal display panel 20 and the third liquid crystal display panel 3 to input a handwritten memorandum (a character, a symbol or the like) so that the handwritten memory is displayed on the second liquid crystal display panel 20 and the third liquid crystal display panel 30. At this time, in the portable telephone, an image displaying operation of the first liquid crystal display panel 10 or an operation of the inputting touch panel 12 provided on the first liquid crystal display panel 10 is controlled so that an operation for the map image displayed on the first liquid crystal display panel 10 is invalidated. When the user operates the inputting touch panels 25, 33 provided on the second liquid crystal display panel 20 and the third liquid crystal display panel 30, accordingly, the operation does not influence the map image.

Consequently, the map image displayed on the first liquid image display panel 10 overlaps with the handwritten memorandum on the second liquid crystal display panel 20 or the third liquid crystal display panel 30 so that they are recognized as a single image by the user. On the second liquid crystal display panel 20 or the third liquid crystal display panel 30 may be displayed a photographic image, a pin and the like as well as the handwritten memorandum.

Figure 41:
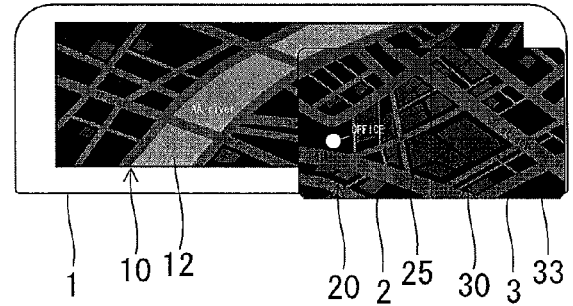
FIG. 41 is a view showing another example of the display configuration of the image (the map image) in the map viewing.

FIG. 41 is a view showing another example of a display configuration of an image in map viewing (a map image). As shown in FIG. 41, in the display configuration, the map image is displayed on the first liquid crystal display panel 10, while a part of the map image displayed on the first liquid crystal display panel 10 is enlarged and displayed on the second liquid crystal display panel 20 and the third liquid crystal display panel 30.

Figure 42:
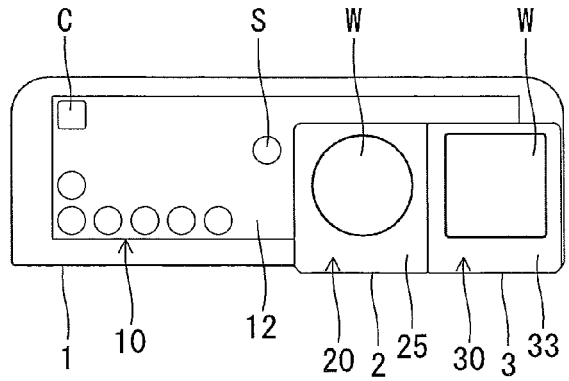
FIG. 42 is a view showing an example of a display configuration of an image on a home screen.

FIG. 42 is a view showing an example of a display configuration of an image on a home screen. As shown in FIG. 42, in the display configuration, on the first liquid crystal display panel 10 are displayed an icon C for carrying out a transfer to a menu screen and a shortcut icon S, and on the second liquid crystal display panel 20 and the third liquid crystal display panel 30 are displayed widgets W.

Figure 43:
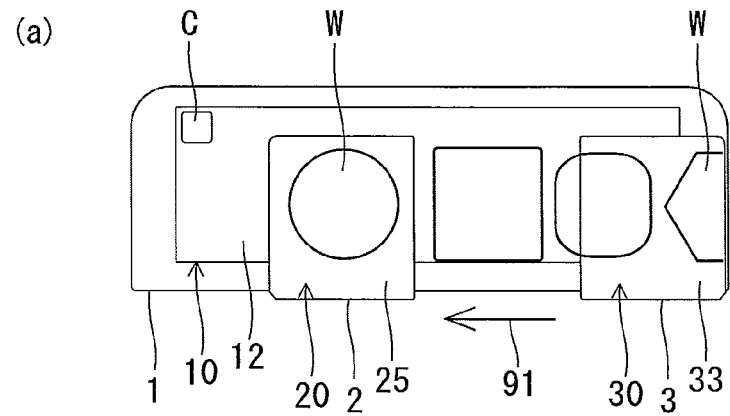
FIGS. 43(a) and 43(b) are views to be used for explaining an operation which can be executed on the home screen.

FIGS. 43(*a*) and 43(*b*) are views to be used for explaining an operation which can be executed on the home screen. As shown in FIG. 43(*a*), in the operation, the user slides the movable display portion 2 in the longitudinal direction 91 of the device body 1 from the abutting position so that a line of widgets W moves leftward (in slid in) depending on the movement quantity of the movable display portion 2 (that is, the movement quantity of the second liquid crystal display panel 20) and the widgets W are thus displayed on a region of the first liquid crystal display panel 10 between an installation region for the fixed display portion 3 and a region with which the movable display portion 2 overlaps. As shown in FIGS. 43(*a*) and 43(*b*), accordingly, a display region for displaying the widgets W is enlarged.

Figure 44:
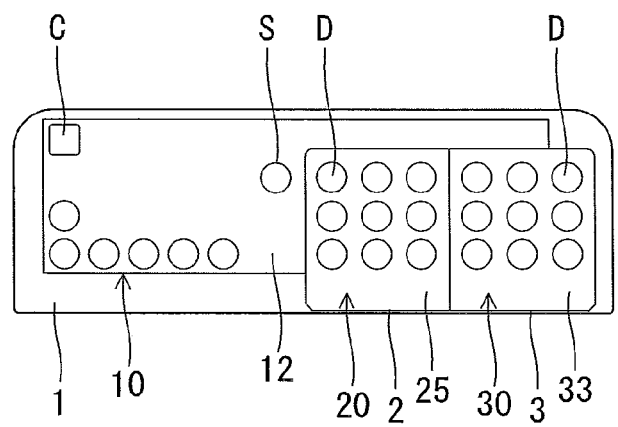
FIG. 44 is a view showing another example of the display configuration of the image on the home screen.

FIG. 44 is a view showing another example of the display configuration of the image on the home screen. In the display configuration shown in FIG. 42, the user operates the inputting touch panel 12 provided on the first liquid crystal display panel 10 to select the icon C for carrying out a transfer to the menu screen so that the second liquid crystal display panel 20 and the third liquid crystal display panel 30 transfer to the menu screen as shown in FIG. 44. Herein, the menu screen is a screen where a plurality of menu icons D corresponding to various functions are displayed in a list.

Figure 45:
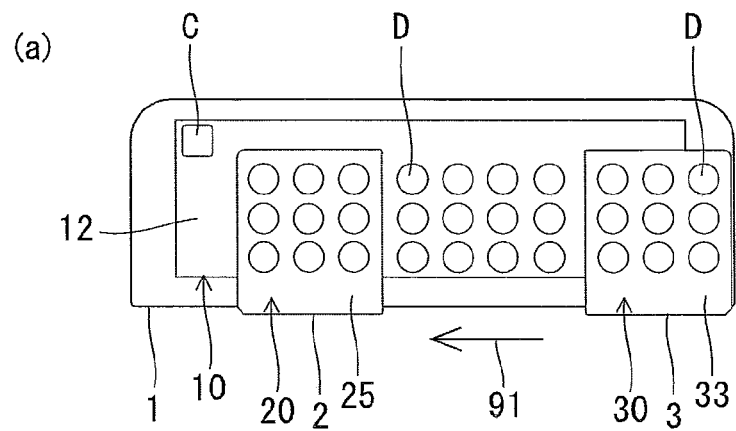
FIGS. 45(a) and 45(b) are views to be used for explaining an operation which can be executed on the home screen illustrated in FIG. 44.

FIGS. 45(*a*) and 45(*b*) are views to be used for explaining an operation which can be executed on the home screen illustrated in FIG. 44. As shown in FIG. 45(*a*), in the operation, the user slides the movable display portion 2 in the longitudinal direction 91 of the device body 1 from the abutting position so that a line of the menu icons D moves leftward (in slid in) depending on the movement quantity of the movable display portion 2 (that is, the movement quantity of the second liquid crystal display panel 20) and the menu icons D are thus displayed on a region of the first liquid crystal display panel 10 between an installation region for the fixed display portion 3 and a region with which the movable display portion 2 overlaps. As shown in FIGS. 45(a) and 45(b), accordingly, a display region for displaying the menu icons D is enlarged.

Figure 46:
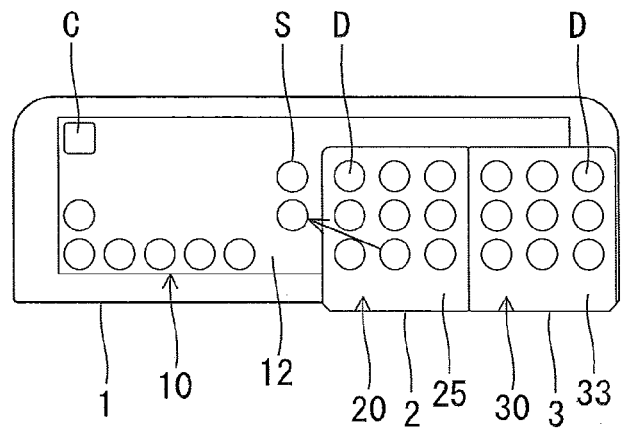
FIG. 46 is a view to be used for explaining another operation which can be executed on the home screen illustrated in FIG. 44.

FIG. 46 is a view to be used for explaining another operation which can be executed on the home screen illustrated in FIG. 44. As shown in FIG. 46, in the operation, the user operates the inputting touch panels 12, 25, 33 to move the menu icon D from the second liquid crystal display panel 20 or the third liquid crystal display panel 30 to the first liquid crystal display panel 10 to create the shortcut icon S of the menu icon D on the first liquid crystal display panel 10.

Figure 47:
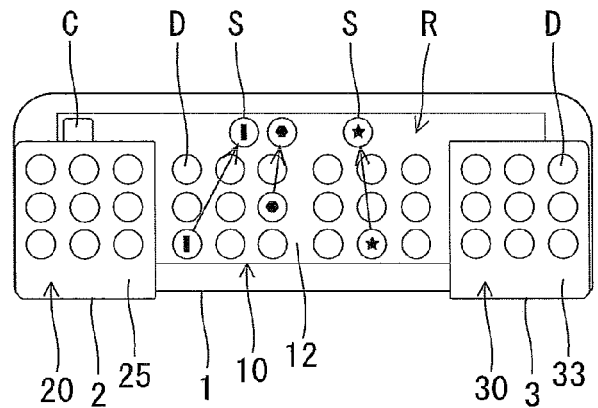
FIG. 47 is a view to be used for explaining an operation which can be executed on the home screen illustrated in FIG. 45(b).

FIG. 47 is a view to be used for explaining an operation which can be executed on the home screen illustrated in FIG. 45(b). As shown in FIG. 47, in the operation, the user operates the inputting touch panel 12 provided on the first liquid crystal display panel 10 to move the menu icon D to a region R on the first liquid crystal display panel 10 with which the second liquid crystal display panel 20 and the third liquid crystal display panel 30 do not overlap to create the shortcut icon S on the region R.

Figure 48:
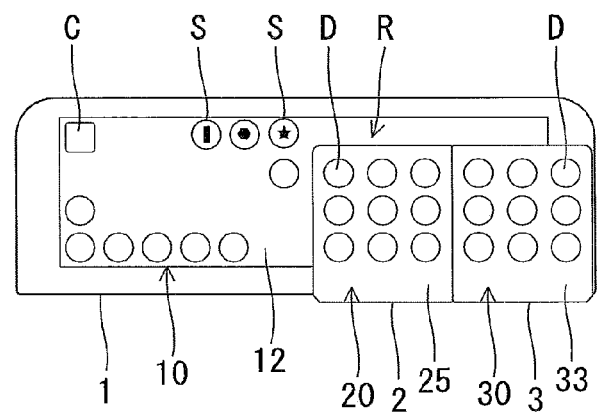
FIG. 48 is a view to be used for explaining the operation which can be executed on the home screen illustrated in FIG. 47.

FIG. 48 is a view to be used for explaining an operation which can be executed on the home screen illustrated in FIG. 47. As shown in FIG. 48, in the operation, the user slides the movable display portion 2 from the separating position to the abutting position so that the shortcut icon S displayed on the region R is rearranged on the region R and is thus displayed on a position which can be visually recognized easily by the user.

Figure 49:
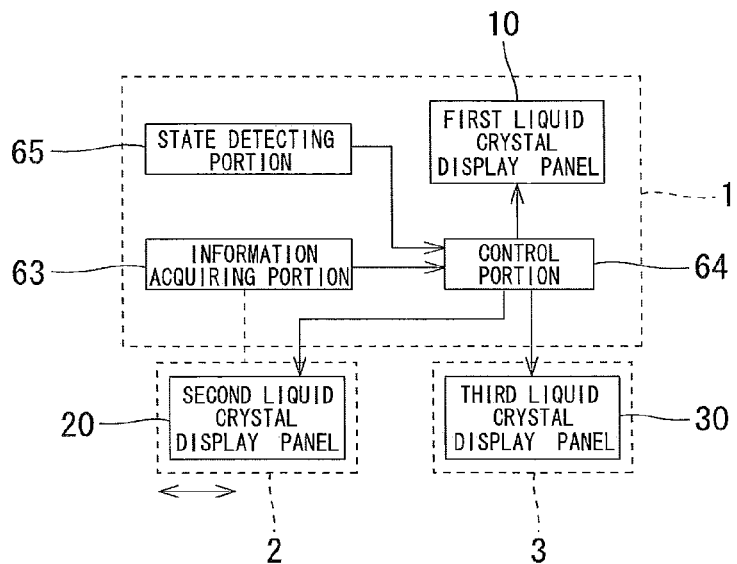
FIG. 49 is a block diagram showing a first variant of the portable telephone.

FIG. 49 is a block diagram showing a first variant of the portable telephone. As shown in FIG. 49, the device body 1 is provided with a state detecting portion 65 for detecting the opening state and the closing state of the second liquid crystal display panel 20 and the third liquid crystal display panel 30 in place of the acceleration sensor 62, and the control portion 64 may change the directions of the images displayed on the first liquid crystal display panel 10, the second liquid crystal display panel 20 and the third liquid crystal display panel 30 depending on the state detected by the state detecting portion 65.

According to the portable telephone in accordance with the first variant, in the same manner as the portable telephone described above, the images can be displayed on the first liquid crystal display panel 10, the second liquid crystal display panel 20 and the third liquid crystal display panel 30 in an orientation depending on the standard posture possessed by the portable telephone when the user holds the portable telephone.

FIG. 50 is a block diagram showing a second variant of the portable telephone. As shown in FIG. 50, the device body 1 may be provided with a movement detecting portion 66 for detecting whether the movable display portion 2 (that is, the second liquid crystal display panel 20) moves along a predetermined path or not in place of the information acquiring portion 63, and the control portion 64 may control image displaying operations of the first liquid crystal display panel 10, the second liquid crystal display panel 20 and the third liquid crystal display panel 30 based on a result of the detection obtained by the movement detecting portion 66.

According to the portable telephone in accordance with the second variant, in the same manner as the portable telephone described above, the movable display portion 2 (that is, the second liquid crystal display panel 20) can be caused to function as an operation portion for operating the images displayed on the first liquid crystal display panel 10, the second liquid crystal display panel 20 and the third liquid crystal display panel 30.

As a third variant of the portable telephone, furthermore, the portable telephone may have a structure in which the fixed display portion 3 is not provided. According to the portable telephone in accordance with the present variant, versatility for a user can be enhanced. More specifically, by moving the movable display portion 2 onto an end portion at a right side of the device body 1, the user can hold the portable telephone by a right hand (or a left hand) to operate the inputting touch panel 25 provided on the second liquid crystal display panel 20 by the right hand (or the left hand). By moving the movable display portion 2 onto an end portion at a left side of the device body 1, moreover, the user can hold the portable telephone by the left hand (or the right hand) to operate the inputting touch panel 25 provided on the second liquid crystal display panel 20 by the left hand (or the right hand).

The structures of the respective portions according to the present invention are not restricted to the embodiment but various changes can be made within the technical scope described in claims. For example, the portable telephone may have a structure in which the fixed display portion 3 is movable. In the case where it is not necessary to display an image having a visual feature in the portable telephone, moreover, the fixed display portion 3 may not have a structure in which light incident from a back surface side thereof is transmitted toward a side of the image display surface 31 of the third liquid crystal display panel 30. The movable display portion 2 is also the same.

Furthermore, the portable telephone may have a structure in which the inputting touch panel is provided only on the image display surface of one panel of the first liquid crystal display panel 10, the second liquid crystal display panel 20 and the third liquid crystal display panel 30. In addition, the first image display portion, the second image display portion and the third image display portion may employ various image display panels such as an organic EL (Electroluminescence) display panel and an LED (Light Emitting Diode) display panel in place of the first liquid crystal display panel 10, the second liquid crystal display panel 20 and the third liquid crystal display panel 30.

Furthermore, it is also possible to employ a connection using a sliding contact in addition to a connection through the flexible lead 5 for an electronic connection of the circuit board 6 to the second liquid crystal display panel 20 of the movable display portion 2.

Various structures employed for the portable telephone can be applied to various portable electronic devices having an image display panel such as a liquid crystal display panel, in addition to the portable telephone.

The invention claimed is:

1. A portable electronic device comprising:
a device body;
a first image display panel provided on a front surface of the device body;
a second image display panel disposed on the front surface of the device body and overlapping with an image display surface of the first image display panel;
a coupling portion for slidably coupling the second image display panel to the device body to reciprocate the second image display panel along a predetermined path over the image display surface of the first image display panel, wherein a length of the portable electronic device is not varied by movement of the second image display panel along said predetermined path;

a third image display panel disposed on the front surface of the device body and overlapping with the image display surface of the first image display panel; and a fixing portion for fixing the third image display panel such that the third image display panel is not able to move relative to the device body and is fixed over an end portion of the image display surface of the first image display panel;

wherein both the second image display panel and the third image display panel have a structure in which light incident from a back surface side of the respective image display panel is transmitted toward a side of an image display surface of the respective image display panel, and wherein the image display surface of at least one of the first image display panel: the second image display panel, and the third image display panel is provided with an inputting touch panel having a light transmittance while covering at least a partial region of the image display surface thereof; and wherein an image display surface of the third image display panel is provided with an inputting touch panel having a light transmittance while covering at least a partial region of the image display surface of the third image display panel, and wherein the device body includes a state detecting portion for detecting an opening state in which the second image display panel and the third image display panel are opened apart from each other and/or a closing state in which the second image display panel and the third image display panel are close to each other or in contact with each other; and a changing portion for changing directions of images to be displayed on the first image display panel, the second image display panel, and the third image display panel depending on the state detected by the state detecting portion.

2. The portable electronic device according to claim 1, wherein the second image display panel is provided with the inputting touch panel having a light transmittance.

3. The portable electronic device according to claim 1, comprising:

an information acquiring portion for acquiring movement quantity information to be varied depending on a movement quantity of the second image display panel from a predetermined position on the predetermined path; and a control portion for controlling an image displaying operation of the first image display panel and/or the second image display panel based on the movement quantity information acquired by the information acquiring portion.

4. The portable electronic device according to claim 1, comprising:

a movement detecting portion for detecting whether the second image display panel moves along the predetermined path or not; and a control portion for controlling the image displaying operation of the first image display panel and/or the second image display panel based on a result of detection obtained by the movement detecting portion.

5. The portable electronic device according to claim 1, wherein an image display surface of the third image display panel is provided with an inputting touch panel having a light transmittance while covering at least a partial region of the image display surface of the third image display panel, and wherein the device body includes a posture detecting portion for detecting a posture of the device body, and a changing portion for changing directions of images to be displayed on the first image display panel, the second image display panel, and the third image display panel depending on the posture detected by the posture detecting portion.

6. The portable electronic device according to claim 1, wherein the third image display panel has a structure in which light incident from a back surface side thereof is transmitted toward a side of the image display surface of the third image display panel.

7. The portable electronic device according to claim 1, wherein, when the second image display panel is positioned at one end of the predetermined path, the second image display panel abuts the third image display panel.

8. A portable electronic device comprising:

a device body;

a first image display panel provided on a front surface of the device body;

a second image display panel disposed on the front surface of the device body and overlapping with an image display surface of the first image display panel;

a coupling portion for slidably coupling the second image display panel to the device body to reciprocate the second image display panel along a predetermined path over the image display surface of the first image display panel;

a third image display panel disposed on the front surface of the device body and overlapping with the image display surface of the first image display panel; and a fixing portion for fixing the third image display panel such that the third image display panel is not able to move relative to the device body and is fixed over an end portion of the image display surface of the first image display panel;

wherein both the second image display panel and the third image display panel have a structure in which light incident from a back surface side of the respective image display panel is transmitted toward a side of an image display surface of the respective image display panel, wherein the image display surface of at least one of the first image display panel, the second image display panel, and the third image display panel is provided with an inputting touch panel having a light transmittance while covering at least a partial region of the image display surface thereof, and wherein the second image display panel is provided with a sliding portion which is slidably coupled to the device body, and a support portion which is fixed to the sliding portion for supporting the second image display panel, the sliding portion is provided with an engaging portion protruded therefrom, while the device body is provided with an engagement receiving portion with which the engaging portion is slidably engaged, and the coupling portion is constituted by the engaging portion and the engagement receiving portion; and wherein an image display surface of the third image display panel is provided with an inputting touch panel having a light transmittance while covering at least a partial region of the image display surface of the third image display panel, and wherein the device body includes
- a state detecting portion for detecting an opening state in which the second image display panel and the third image display panel are opened apart from each other and/or a closing state in which the second image display panel and the third image display panel are close to each other or in contact with each other; and
- a changing portion for changing directions of images to be displayed on the first image display panel, the second image display panel, and the third image display panel depending on the state detected by the state detecting portion.

9. The portable electronic device according to claim 8, wherein a part of the support portion overlapping with at least the image display surface of the first image display panel has a light transmittance.

10. The portable electronic device according to claim 8, wherein the device body has opposite sides and the coupling portion is provided on one side only of the device body and second image display panel.

11. The portable electronic device according to claim 10, wherein the first image display panel has opposite first and second sides and opposite ends, and the second image display panel extends from said one side of the device body partially across the first image display panel from said first side and terminates short of the second side of the first image display panel.

12. A portable electronic device comprising:
- a casing;
- a first image display portion provided on the casing, the first image display portion having a length;
- a second image display portion provided on the casing to overlap with the first image display portion for transmitting light incident from a first direction to a second direction;
- a coupling portion for reciprocating the second image display portion over the first image display portion along a predetermined path extending over more than half of the length of the first image display portion;
- a third image display portion provided on the casing to overlap with the first image display portion;
- a fixing portion for fixing the third image display portion such that third image display portion is not able to move relative to the casing and is fixed over an end portion of an image display surface of the first image display portion; and
- a touch panel having a light transmittance while covering at least a partial region of at least one of the first image display portion and the second image display portion; and
- wherein an image display surface of the third image display panel is provided with an inputting touch panel having a light transmittance while covering at least a partial region of the image display surface of the third image display panel, and wherein the device body includes
- a state detecting portion for detecting an opening state in which the second image display panel and the third image display panel are opened apart from each other and/or a closing state in which the second image display panel and the third image display panel are close to each other or in contact with each other; and
- a changing portion for changing directions of images to be displayed on the first image display panel, the second image display panel, and the third image display panel depending on the state detected by the state detecting portion.

13. The portable electronic device according to claim 12, wherein the touch panel is disposed in the second image display portion.

14. The portable electronic device according to claim 13, further comprising:
- an information acquiring portion for acquiring a movement quantity of the second image display portion from a predetermined position on the predetermined path; and
- a control portion for controlling at least one of displays on the first image display portion and the second image display portion depending on the movement quantity.

15. The portable electronic device according to claim 13, further comprising:
- a movement detecting portion for detecting whether the second image display portion moves along the predetermined path or not; and
- a control portion for controlling at least one of displays on the first image display portion and the second image display portion based on a result obtained by the movement detecting portion.

16. The portable electronic device according to claim 13, further comprising:
- a state detecting portion for detecting whether or not the second image display portion and the third image display portion are set into an opening state in which the second image display portion and the third image display portion are apart from each other; and
- a control portion for controlling a display on the first image display portion depending on a result of detection obtained by the state detecting portion.

17. The portable electronic device according to claim 13, further comprising:
- a state detecting portion for detecting whether or not the second image display portion and the third image display portion are set into an opening state in which the second image display portion and the third image display portion are apart from each other; and
- a control portion for controlling displays on the second image display portion and the third image display portion depending on a result of detection obtained by the state detecting portion.

* * * * *